United States Patent
Chae

(10) Patent No.: US 11,825,278 B2
(45) Date of Patent: Nov. 21, 2023

(54) DEVICE AND METHOD FOR AUTO AUDIO AND VIDEO FOCUSING

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 748 days.

(21) Appl. No.: 16/934,953

(22) Filed: Jul. 21, 2020

(65) Prior Publication Data
US 2021/0124929 A1    Apr. 29, 2021

(30) Foreign Application Priority Data
Oct. 23, 2019    (KR) .................. 10-2019-0132344

(51) Int. Cl.
| | |
|---|---|
| *H04N 1/00* | (2006.01) |
| *H04R 3/00* | (2006.01) |
| *H04R 1/40* | (2006.01) |
| *H04R 3/04* | (2006.01) |
| *G10L 25/51* | (2013.01) |
| *G06V 20/40* | (2022.01) |
| *G06F 18/23* | (2023.01) |

(Continued)

(52) U.S. Cl.
CPC ............ *H04R 3/005* (2013.01); *G06F 18/23* (2023.01); *G06V 10/82* (2022.01); *G06V 20/41* (2022.01); *G10L 25/51* (2013.01); *H04N 23/69* (2023.01); *H04R 1/406* (2013.01); *H04R 3/04* (2013.01)

(58) Field of Classification Search
CPC ........ G06V 10/82; G06V 20/41; H04N 23/69; G10L 25/51; H04R 1/406; H04R 3/04
USPC ....................................................... 382/103
See application file for complete search history.

(56) References Cited

U.S. PATENT DOCUMENTS

| | | | | |
|---|---|---|---|---|
| 10,206,036 B1 * | 2/2019 | Feng | .................. | G06V 40/161 |
| 10,917,721 B1 * | 2/2021 | Chae | ...................... | G06V 10/82 |

(Continued)

FOREIGN PATENT DOCUMENTS

| | | |
|---|---|---|
| KR | 10-0860994 | 9/2008 |
| KR | 10-2014-0000586 | 1/2014 |
| KR | 10-2019-0118994 | 10/2019 |

OTHER PUBLICATIONS

Korean Intellectual Property Office Application No. 10-2019-0132344, Office Action dated Aug. 21, 2023, 5 pages.

*Primary Examiner* — Gabriel I Garcia
(74) *Attorney, Agent, or Firm* — LEE, HONG, DEGERMAN, KANG & WAIMEY PC

(57) ABSTRACT

Disclosed are a device and a method for providing automatically focusing on audio and video. An operation method of an electronic device comprises registering objects of interest, capturing video, displaying the video on a display unit, inferring at least one object of interest included in the video among the objects of interest, adjusting a zoom of the video being captured by controlling the capturing unit based on a position of the at least one object of interest and performing audio focusing by adjusting activity of each of the multiple microphones based on the position of the at least one object of interest. Accordingly, in capturing video by means of the electronic device, the satisfaction with capturing results can be enhanced by emphasizing the audio of interest and by video focusing.

20 Claims, 12 Drawing Sheets

(51) Int. Cl.
*H04N 23/69* (2023.01)
*G06V 10/82* (2022.01)

(56) References Cited

U.S. PATENT DOCUMENTS

2013/0342731 A1* 12/2013 Lee .................. H04N 23/80
                                        348/231.4
2018/0349708 A1* 12/2018 van Hoof ......... G08B 13/19684
2021/0127205 A1*  4/2021 Chae ................. H04R 3/005

* cited by examiner 10　　　31　　　33　　　20 ized in the object of interest within the zoom-in area, thereby further emphasizing the audio of interest.
DEVICE AND METHOD FOR AUTO AUDIO AND VIDEO FOCUSING

CROSS REFERENCE TO RELATED APPLICATIONS

Pursuant to 35 U.S.C. § 119(a), this application claims the benefit of earlier filing date and right of priority to Korean Patent Application No. 10-2019-0132344, filed Oct. 23, 2019, the contents of which are hereby incorporated by reference herein in its entirety.

BACKGROUND

Modern electronic devices have microphones for obtaining sounds while simultaneously capturing video using a camera. In general, a microphone obtains a variety of surrounding sounds that acts as noise along with the desired sound. Accordingly, in order to increase the satisfaction of a user, an audio focusing technique for obtaining only a desired sound is required.

In addition, in order to focus on only an object of interest in capturing video, the user has to often provide an input for performing zoom-in/zoom-out. This frequent input causes the user to feel unsatisfactory.

SUMMARY

Various embodiments of the present disclosure relate to a device and a method for providing automatically focusing on audio and video.

While there may be multiple objects of interest in capturing video of an electronic device, current devices which are not capable of audio focusing on the multiple objects of interest have a limitation in providing a satisfactory captured video. In addition, the electronic device had to require a direct user input for audio focusing and video focusing.

Various embodiments of the present disclosure can provide an electronic device and a method for automatically performing focusing on video and audio.

In addition, various embodiments of the present disclosure may provide an electronic device and a method for providing optimized audio filtering for further emphasizing focused audio.

The technical problem to be overcome in this document is not limited to the above-mentioned technical problems. Other technical problems not mentioned can be clearly understood from the those described below by a person having ordinary skill in the art.

One embodiment is an electronic device comprising a capturing unit configured to capture video, a microphone array configured to have multiple microphones, a display unit configured to display the video and at least one processor configured to operatively connect with the capturing unit, the microphone array, and the display unit. The at least one processor may configured to register objects of interest, may display the video captured by the capturing unit on the display unit, infer at least one object of interest included in the video among the objects of interest, adjust a zoom of the video being captured by controlling the capturing unit based on a position of the at least one object of interest, and perform audio focusing by adjusting activity of each of the multiple microphones based on the position of the at least one object of interest.

Another embodiment is an operation method of an electronic device may comprise registering objects of interest; capturing video, displaying the video on a display unit; inferring at least one object of interest included in the video among the objects of interest, adjusting a zoom of the video being captured based on a position of the at least one object of interest and performing audio focusing by adjusting activity of each of the multiple microphones included in a microphone array based on the position of the at least one object of interest.

According to various embodiments of the present disclosure, the electronic device can increase the satisfaction with capturing results by, in capturing video, emphasizing audio of interest and by focusing images.

According to various embodiments of the present disclosure, when a user zooms in (enlarges) the video, the electronic device performs audio filtering and audio focusing which are special According to various embodiments of the present disclosure, the electronic device does not require separate user inputs for audio and video focusing, so that the usability of the user can be increased.

Advantageous effects that can be obtained from the present disclosure is not limited to the above-mentioned effects. Further, other unmentioned effects can be clearly understood from the following descriptions by those skilled in the art to which the present disclosure belongs.

BRIEF DESCRIPTION OF THE DRAWINGS

In connection with the description of the drawings, the same or similar reference numerals may be used for the same or similar components.

DETAILED DESCRIPTION OF THE EMBODIMENTS

Figure 1:
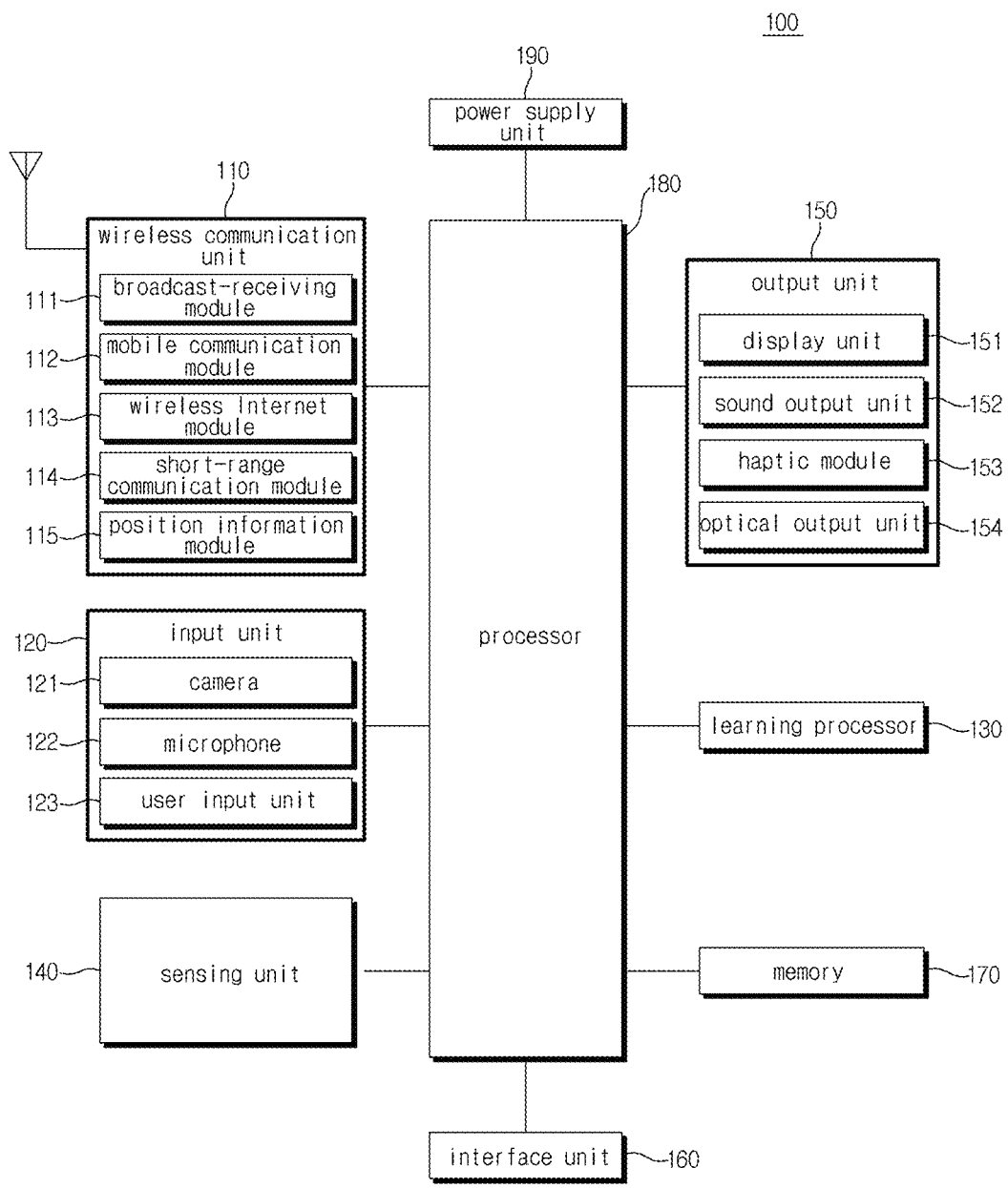
FIG. 1 is a block diagram showing an electronic device which performs auto audio and video focusing according to various embodiments of the present disclosure.

Hereinafter, embodiments of the present disclosure will be described in detail with reference to the accompanying drawings, in which the same or similar components will be given the same reference numerals, and redundant description thereof will be omitted.

The suffixes "module" or "unit" for components used in the following description are given or mixed in consideration of ease of specification, and do not have distinct meanings or roles. In addition, "module" or "unit" means a hardware component such as software or a field programmable gate array (FPGA) or an application specific integrated circuit (ASIC), and the "unit" or "module" performs certain roles. However, "unit" or "module" is not limited to software or hardware. The "unit" or "module" may be configured to be positioned in an addressable storage medium or may be configured to regenerate one or more processors. Thus, as an example, the "unit" or "module" may include components such as software components, object-oriented software components, class components, and task components, processes, functions, properties, procedures, subroutines, segments of program code, drivers, firmware, microcode, circuitry, data, databases, data structures, tables, arrays, and variables. Functions provided within components and "unit" or "modules" may be separated into smaller numbers of components and "units" or "modules" or integrated into additional components and "unit" or "modules".

The steps of a method or algorithm described in connection with some embodiments of the present invention may be embodied directly in hardware module, software module, or a combination thereof, executed by a processor. The software module may reside in RAM memory, flash memory, ROM memory, EPROM memory, EEPROM memory, registers, hard disk, removable disk, CD-ROM, or any other type of recording medium known in the art. An exemplary recording medium is coupled to the processor, which can read information from and write information to the storage medium. In the alternative, the recording medium may be integral to the processor. The processor and the recording medium may reside in an application specific integrated circuit (ASIC). The ASIC may reside in a user terminal.

In the following description of the embodiments disclosed herein, if it is determined that the detailed description of the related known technology may obscure the gist of the embodiments disclosed herein, the detailed description thereof will be omitted. In addition, since the accompanying drawings are intended to facilitate understanding of the embodiments disclosed herein, it should be understood that the technical scope disclosed in the present specification is not limited by the accompanying drawings and includes all changes, equivalents, and substitutes included in the spirit and scope of the present invention.

Terms including ordinal numbers such as first and second may be used to describe various components, but the components are not limited by the terms. The terms are used only for the purpose of distinguishing one component from another.

When it is said that a component is "connected" or "coupled" to another component, the component may be directly connected to or coupled to that other component, but it should be understood that another component may exist between them. On the other hand, when it is said that a component is "directly connected" or "directly coupled" to another component, it should be understood that no other component may exist between them.

Audio focusing described below may be also referred to as audio zooming, in which, in order to allow the audio of a specific object to be emphatically obtained more than the audio of other surrounding objects, audio focusing is defined as a technique of focusing the direction of the microphone array on the specific object.

In addition, the distribution of audio focusing may be defined as a technique in which audio of multiple objects of interest are emphatically obtained more than the audio of other surrounding objects, by dividing the degree of focusing the direction of the microphone array on each object of interest.

FIG. 1 is a block diagram showing an electronic device 100 which performs auto audio and video focusing according to various embodiments of the present disclosure.

The electronic device 100 shown in FIG. 1 is mobile electronic devices such as a mobile phone, a smart phone, a laptop computer, an artificial intelligence device for digital broadcasting, a personal digital assistant (PDA), a portable multimedia player (PMP), navigation, and a slate PC, tablet PC, an Ultrabook, a wearable device (e.g., a smartwatch, smart glasses, a head mounted display (HMD)), and the like, or a fixed electronic device such as a refrigerator, a washing machine, a smart TV, a desktop computer, a digital signage, and the like. In addition, the electronic device 100 may be a fixed or movable robot.

According to an embodiment of a configuration of the electronic device 100 shown in FIG. 1, each component may be configured with one chip, component, or electronic circuit, or may be configured with a combination of chips, components, or electronic circuits. According to another embodiment, some of the components shown in FIG. 1 may be separated into several components and may be configured with different chips, components, or electronic circuits; or several components may be combined to form a single chip, component, or electronic circuit. In addition, according to another embodiment, some of the components shown in FIG. 1 may be deleted or components not shown in FIG. 1 may be added. For example, in the case of a desktop computer, the wireless communication unit 110 shown in FIG. 1 may be deleted, and a wired communication unit including Ethernet and/or a LAN may be added.

Referring to FIG. 1, the electronic device 100 according to various embodiments of the present disclosure may include a wireless communication unit 110, an input unit 120, a learning processor 130, a sensing unit 140, an output unit 150, and an interface unit 160, a memory 170, a processor 180, and a power supply 190.

According to various embodiments of the present disclosure, the wireless communication unit 110 may include at least one of a broadcast receiving module 111, a mobile communication module 112, a wireless internet module 113, a local area communication module 114, and a location information module 115.

The broadcast receiving module 111 may receive a broadcast signal and/or broadcast related information from an external broadcast management server through a broadcast channel.

The mobile communication module 112 may transmit and receive a radio signal for data communication with at least one of a base station, an external terminal, a server on a mobile communication network built according to technical standards or communication schemes for mobile communication (e.g., Global System for Mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and the like).

The wireless internet module 113 refers to a module for wireless internet access and may be disposed internal and external to the electronic device 100. The wireless internet module 113 may transmit and receive wireless signals for data communication in a communication network according to wireless internet technologies.

The wireless internet technology includes, for example, wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

The local area communication module 114 is used for local area communication and supports the local area communication by using at least one of Bluetooth™, radio frequency identification (RFID), infrared data association (IrDA), ultra-wideband (UWB), ZigBee, near field communication (NFC), wireless-fidelity (Wi-Fi), Wi-Fi Direct, and wireless universal serial bus (USB).

The location information module 115 is a module for obtaining the location (or current location) of the electronic device 100, and a representative example thereof includes a global positioning system (GPS) module or a wireless fidelity (WiFi) module. For example, when the electronic device 100 utilizes the GPS module, the electronic device 100 may obtain the location of the electronic device 100 using a signal transmitted from a GPS satellite.

The input unit 120 may include a camera 121 for inputting a video signal, a microphone 122 for receiving an audio signal, and a user input unit 123 for receiving information from a user. According to the embodiment of the present disclosure, the camera 121 may include a plurality of cameras that performs capturing in directions different from each other, and the microphone 122 may include a plurality of microphones constituting the directional microphone array.

The audio data or image data collected by the input unit 120 may be analyzed and processed according to control commands of the user.

The camera 121 processes an image frame such as a still image or a video obtained by an image sensor in a video call mode or a capturing mode. The processed image frame may be displayed on the display unit 151 or stored in the memory 170.

The microphone 122 processes external sound signals into electrical audio data. The processed audio data may be utilized in various ways according to a function (or an application program being executed) performed by the electronic device 100. Meanwhile, various noise reduction algorithms may be implemented in the microphone 122 in order to remove noises generated during receiving the external sound signals.

The user input unit 123 is used for receiving information from the user. When information is input through the user input unit 123, the processor 180 may control an operation of the electronic device 100 to correspond to the input information.

The user input unit 123 may include a mechanical input means (or a mechanical key, such as a button, a dome switch, a jog wheel, a jog switch located at front/rear surface or side surface of the electronic device 100) and touch input means. As an example, the touch input means may include a virtual key, a soft key, or a visual key displayed on the touch screen through a software process, or include a touch key disposed on a region other than the region where the touch screen is located.

The sensing unit 140 may include one or more sensors for sensing at least one of information in the electronic device 100, surrounding environment information surrounding the electronic device 100, and user information.

For example, the sensing unit 140 may include at least one of a proximity sensor, an illumination sensor, a touch sensor, an acceleration sensor, a magnetic sensor, a gravity sensor, a gyroscope sensor, motion sensor, RGB sensor, infrared sensor (IR sensor), fingerprint scan sensor, ultrasonic sensor, optical sensor (e.g., camera, see 121), microphones (e.g., see 122), battery gauges, environmental sensors (e.g. barometers, hygrometers, thermometers, radiation sensors, heat sensors, gas sensors, etc.), chemical sensors (e.g. an electronic nose, a healthcare sensor, a biometric sensor, etc.). Meanwhile, the electronic device 100 disclosed in the present disclosure may use a combination of information detected by at least two or more of these sensors.

The output unit 150 is used to generate outputs related to visual, auditory, or tactile senses, and includes at least one of a display unit 151, a sound output unit 152, a haptic module 153, and a light output unit 154.

The display unit 151 displays (outputs) information processed by the electronic device 100. For example, the display unit 151 may display execution screen information of an application program operated in the electronic device 100, or user interface (UI) and graphic user interface (GUI) information according to the execution screen information.

The display unit 151 is structured in a manner as to have a layer structure with a touch sensor or be integrally formed with a touch sensor, thereby implementing a touch screen. The touch screen may function as a user input unit 123 providing an input interface between the electronic device 100 and the user, while providing an output interface between the electronic device 100 and the user.

The sound output unit 152 may output audio data received from the wireless communication unit 110 or stored in the memory 170 in a call signal reception mode, a call mode, a recording mode, a voice recognition mode, a broadcast reception mode, and the like.

The sound output unit 152 may include at least one of a receiver, a speaker, and a buzzer.

The haptic module 153 may generate various tactile effects that a user can feel. A representative example of the tactile effect generated by the haptic module 153 may include vibration.

The light output unit 154 outputs a signal for notifying event occurrence by using light from a light source of the electronic device 100. Examples of events occurring in the electronic device 100 may include message reception, call signal reception, a missed call, an alarm, a schedule notification, email reception, information reception through an application, and the like.

The interface unit 160 serves as a path to various types of external devices connected to the electronic device 100. The interface unit 160 may include at least one of a wired/wireless headset port, an external charger port, a wired/wireless data port, a memory card port, port connecting a device equipped with an identification module, an audio input/output (I/O) port, a video input/output (I/O) port, and an earphone port. In response to the connection of the external device to the interface unit 160, the electronic device 100 may perform appropriate control related to the connected external device.

Meanwhile, the identification module is a chip that stores a variety of information for authenticating the use rights of the electronic device 100, and includes a user identification module (UIM), subscriber identity module (SIM), universal subscriber identity module (USIM), and the like. The device equipped with the identification module (hereinafter referred to as an "identification device") may be manufactured in the form of a smart card. Therefore, the identification device may be connected to the electronic device 100 through the interface unit 160.

The memory 170 stores data supporting various functions of the electronic device 100. The memory 170 may store multiple application programs or applications that are driven in the electronic device 100, data used for operating the electronic device 100, instructions, and data used for operation of the learning processor 130 (e.g., at least one algorithm information for machine learning, etc.).

The power supply unit 190 may supply power to each component included in the electronic device 100 by receiving an external power source or an internal power source under the control of the processor 180. The power supply unit 190 includes a battery, which may be a built-in battery or a replaceable battery.

The processor 180 may determine or predict at least one executable operation of the electronic device 100 on the basis of information generated or determined using data analysis and machine learning algorithm. To this end, the processor 180 may request, search, receive, or utilize data of the learning processor 130, and control the electronic device 100 to perform a predicted operation or an operation determined to be desirable among the at least one executable operation.

The processor 180 may perform various functions for implementing intelligent emulation (i.e., a knowledge-based system, an inference system, and a knowledge acquisition system). The functions may be applied to various types of systems (e.g., fuzzy logic systems), including adaptive systems, machine learning systems, artificial neural networks, and the like.

The processor 180 may also include sub-modules that enable operations involving audio and natural language voice processing, such as an I/O processing module, an environmental condition module, a speech-to-text (STT) processing module, a natural language processing (NLP) module, a workflow processing module, and a service processing module.

Each of these submodules may have access to one or more systems, or data and model, or a subset or super set thereof, in the electronic device 100. In addition, each of these submodules may provide various functions, including lexical index, user data, workflow model, service model, and automatic speech recognition (ASR) system.

According to other embodiments, other aspects of the processor 180 or the electronic device 100 may be implemented with the submodule, system, or data and model.

According to some embodiments, based on data of the learning processor 130, the processor 180 may be configured to detect requirements on the basis of a user's intention or a contextual condition expressed in user input or natural language input.

The processor 180 may actively derive and obtain the information required to fully determine the requirements on the basis of the contextual condition or the user's intention. For example, the processor 180 may actively derive the information required to determine the requirements by analyzing historical data, including historical input and output, pattern matching, unambiguous words, input intent, and the like.

The processor 180 may determine a flow of operations for executing a function in response to the requirement on the basis of the contextual condition or the user's intention.

The processor 180 collects, detects, extracts, and/or receives signals or data used for data analysis and machine learning tasks through one or more sensing components in the electronic device 100 to collect information for processing and storage in the learning processor 130.

The information collection may include sensing information via a sensor, extracting information stored in memory 170, receiving information from another electronic device, entity, or external storage device via a communication means, and so on.

The processor 180 may collect and store usage history information of the electronic device 100.

The processor 180 can use the stored usage history information and predictive modeling to determine the best match in which a particular function is executed.

The processor 180 may receive or detect surrounding environment information or other information through the sensing unit 140.

The processor 180 may receive a broadcast signal and/or broadcast related information, a wireless signal, and wireless data through the wireless communication unit 110, and may communicate with an external electronic device.

The processor 180 may receive image information (or a corresponding signal), audio information (or a corresponding signal), data, or user input information from the input unit 120.

The processor 180 collects information in real time, processes or classifies the information (e.g., knowledge graph, command policy, personalization database, conversation engine, etc.), and stores the processed information in the memory 170 or the learning processor 130.

When the operation of the electronic device 100 is determined on the basis of data analysis and machine learning algorithms and techniques, the processor 180 may control components of the electronic device 100 to perform the determined operation. The processor 180 may control the electronic device 100 according to the control command, thereby performing the determined operation.

When a specific operation is executed, the processor 180 analyzes historical information indicating execution of the specific operation through data analysis and machine learning algorithms and techniques, and updates the previously learned information on the basis of the analyzed information.

Accordingly, the processor 180 may improve accuracy of future performance of data analysis and machine learning algorithms and techniques on the basis of the updated information, together with the learning processor 130.

The processor 180 typically controls the overall operation of the electronic device 100 in addition to the operations associated with the application program. For example, when the state of the electronic device 100 satisfies a set condition, the processor 180 may execute or release a lock state that restricts an input of a user's control command to the applications.

The processor 180 may process signals, data, information, or the like input or output through the above-described components or operate the application program stored in the memory 170, thereby providing or processing information or functions that are suitable for the user.

In addition, the processor 180 may control at least some of the components shown in FIG. 1 to operate the application program stored in the memory 170. In addition, the processor 180 may operate a combination of at least two of the components included in the electronic device 100 in combination with each other to run the application program.

The learning processor 130 may be configured to receive, classify, store, and output information to be used for data mining, data analysis, intelligent decision making, and machine learning algorithms and techniques.

The learning processor 130 may include one or more memory units configured to store data, which is received, detected, sensed, generated, and predefined by the electronic device 100; is received, detected, sensed, generated, and predefined using other methods; or is outputted by other components, devices, electronic devices, or devices in communication with the electronic device.

The learning processor 130 may include a memory integrated with or implemented in the electronic device 100. According to some embodiments, the learning processor 130 may be implemented using the memory 170.

Alternatively or additionally, the learning processor 130 may be implemented using a memory associated with the electronic device 100, such as an external memory coupled directly to the electronic device 100, or a memory maintained in a server in communication with the electronic device 100.

In another embodiment, the learning processor 130 may be implemented using a memory maintained in a cloud computing environment, or another remote memory accessible by the electronic device 100 through a communication scheme such as a network.

The learning processor 130 may be typically configured to store data in one or more databases, in order to perform supervised learning, unsupervised learning, reinforcement learning, data mining, predictive analytics, or identify, index, categorize, manipulate, store, retrieve, and output the data for use in other electronic devices.

The information stored by the learning processor 130 may be used by one or more other controllers of the processor 180 or the electronic device 100 using any of a variety of different types of data analysis algorithms and machine learning algorithms.

Examples of such algorithms include k-near neighbor systems, fuzzy logic (e.g. probability theory), neural networks, Boltzmann machines, vector quantization, pulse neural networks, support vector machines, maximum margin classifiers, hill climbing, inductive logic systems Bayesian networks, Petri Net (e.g., finite state machines, Millie machines, Moore finite state machines), classifier trees (e.g., Perceptron tree, support vector tree, Markov tree, decision tree forest, random forest), Pandon model and system, artificial fusion, sensor fusion, image fusion, reinforcement learning, augmented reality, pattern recognition, automated planning, and the like.

The learning processor 130 may store an artificial neural network (ANN) model used in a machine learning algorithm in a memory, store a learning model generated by training the artificial neural network model, and perform operations such as classification, detection, and recognition on the basis of data input by using the learning model.

Artificial intelligence refers to the field of researching artificial intelligence or methodology to produce the same, and machine learning refers to the field of researching methodology to define and solve various problems dealt in the field of artificial intelligence. The machine learning may be defined as an algorithm that improves the performance of any task through a steady experience on the task.

An artificial neural network is a model used for the machine learning, and may refer to a model having a problem-solving ability, which is composed of artificial neurons (nodes) forming a network via synaptic coupling. The artificial neural network may be defined by a connection pattern between neurons of another layer, a learning process of updating model parameters, and an activation function of generating an output value.

Figure 2:
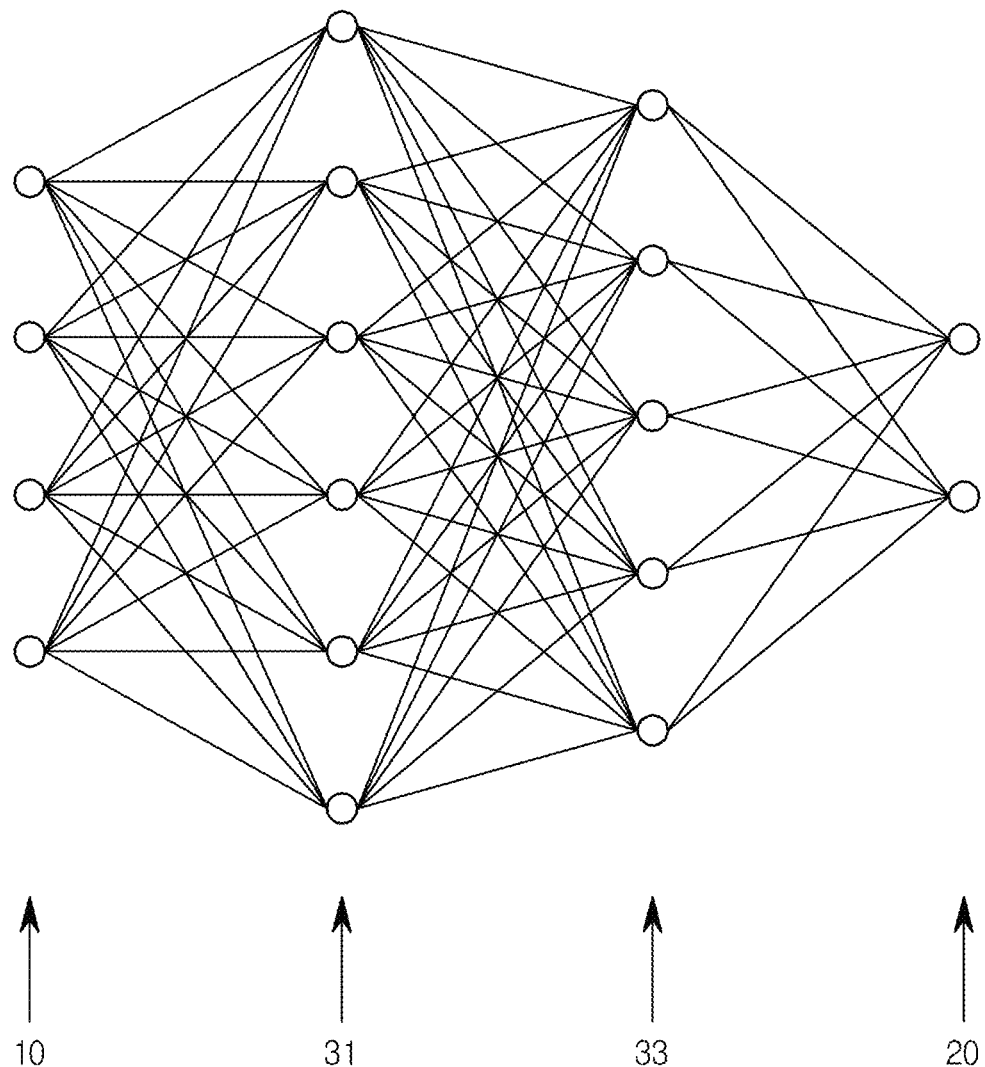
FIG. 2 is a view showing an example of a fully connected artificial neural network structure.

FIG. 2 is a view showing an example of a fully connected artificial neural network structure.

Referring to FIG. 2, an artificial neural network may include an input layer 10, an output layer 20, and optionally one or more hidden layers 31 and 33. Each layer includes one or more nodes corresponding to neurons in the neural network, and the artificial neural network may include synapses that connect between nodes in one layer and nodes in another layer. In the artificial neural network, a node may receive input signals input through a synapse, and generate an output value on the basis of an activation function of weights and deflections for each input signal. The output value of each node may act as an input signal of the next layer through synapses. An artificial neural network in which all nodes of one layer and all nodes of the next layer are connected to each other through synapses may be referred to as a fully connected artificial neural network.

The parameters of the artificial neural network model mean parameters determined through learning, and may include weights of synaptic connections and deflections of neurons. In addition, a hyper parameter refers to a parameter that should be set before learning in the machine learning algorithm, and may include a learning rate, the number of repetitions, a minimal batch size, an initialization function, and the like.

Machine learning, which is implemented by a deep neural network (DNN) including multiple hidden layers among artificial neural networks, is referred to as deep learning, and the deep learning is a part of machine learning. Hereinafter, machine learning may be used to include depth learning.

Figure 3:
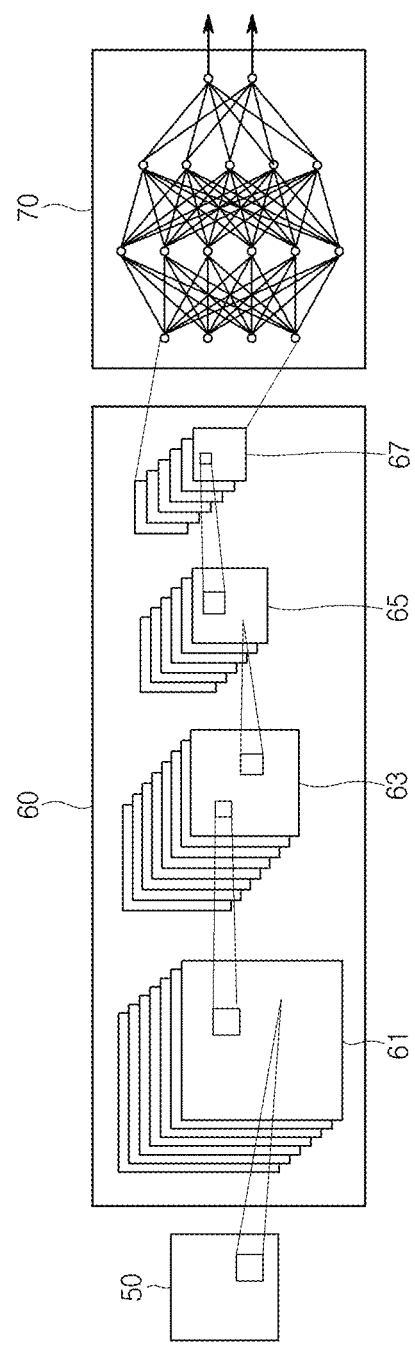
FIG. 3 is a view showing an example of a convolutional neural network (CNN) structure, which is a type of deep neural network.

FIG. 3 is a view showing an example of a convolutional neural network (CNN) structure, which is a type of deep neural network.

A convolutional neural network as shown in FIG. 3 may be more effective in identifying structural spatial data such as images, videos, and text strings. The convolutional neural network may effectively recognize features of adjacent images while maintaining spatial information of the image.

Referring to FIG. 3, the convolutional neural network may include a feature extraction layer 60 and a classification layer 70. The feature extraction layer 60 may synthesize things located spatially close to the image using a convolution, thereby extracting a feature of the image.

The feature extraction layer 60 may be configured with multiple convolutional layers 61 and 65 and multiple pooling layers 63 and 67. The convolutional layers 61 and 65 may be obtained by applying a filter and then an activation function to input data. The convolutional layers 61 and 65 may include multiple channels, and filters and/or activation functions different from each other may be applied to each channel. The result of the convolutional layers 61, 65 may be a feature map. The feature map may be data in the form of a two-dimensional matrix. The pooling layers 63 and 67 may receive output data of the convolutional layers 61 and 65, i.e., feature map, as inputs, and may be used to reduce the size of the output data or to emphasize specific data. The pooling layers 63 and 67 may generate output data by applying max pooling that selects a maximum value, average pooling that selects an average value, and min pooling that selects a minimum value, among some data of the output data of the convolutional layers 61 and 65.

The feature map created through a series of convolutional layers and pooling layers may become gradually smaller in size. The final feature map generated through the last convolutional layer and pooling layer may be converted into a one-dimensional form and input into the classification layer 70. The classification layer 70 may be the fully connected artificial neural network structure shown in FIG. 2. The number of input nodes in the classification layer 70 may be equal to that obtained by multiplying the number of elements in the matrix of the final feature map by the number of channels.

In addition to the convolutional neural network above-described as a deep neural network structure, a recurrent neural network (RNN), a long short-term memory network (LSTM), gated recurrent units (GRU), and the like may be used. The recurrent neural network may perform classification or prediction by learning sequential data, and has a cyclic structure inside so that the past learning is multiplied by a weight and reflected in the current learning. Thus, the current output result is affected by the output result in the past, and the hidden layer serves as a kind of memory function. The recurrent neural network may be used for analyzing a voice waveform to perform a machine translation, identifying components before and after sentence in a text to generate the text, or recognizing voice.

The artificial neural network learning has an adjective to determine model parameters that minimize a loss function. The loss function may be used as an index for determining an optimal model parameter in the learning process of the artificial neural network. In the case of a fully connected artificial neural network, a weight of each synapse may be determined through learning, and in the case of a convolutional neural network, a filter of a convolutional layer for extracting the feature map may be determined through learning.

The machine learning may be categorized into supervised learning, unsupervised learning, and reinforcement learning.

The supervised learning may mean a method of learning the artificial neural network in a state that a label for learning data is given, in which the label may mean a correct answer (or result value) that the artificial neural network should infer when the learning data is input to the artificial neural network. The unsupervised learning may mean a method of learning the artificial neural network in a state that a label for learning data is not given. The reinforcement learning may mean a method of learning the artificial neural network so that an agent defined in any environment selects an action or a sequence of actions that maximizes cumulative rewards in each state.

Figure 4:
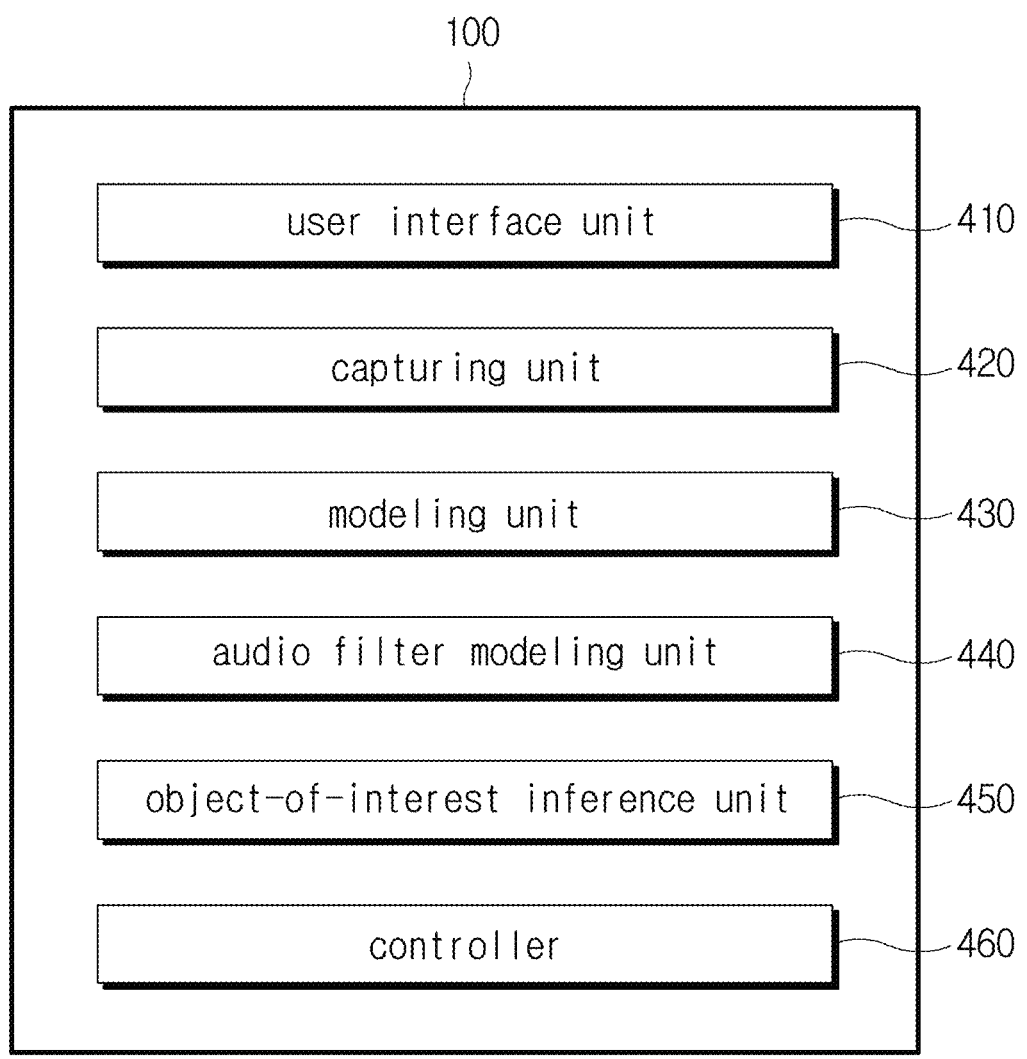
FIG. 4 is a block diagram showing components that are performed by at least one processor of an electronic device 100 according to various embodiments of the present disclosure.

FIG. 4 is a block diagram showing components that are performed by at least one processor of the electronic device 100 according to various embodiments of the present disclosure. The components shown in FIG. 4 may be software programs or application modules that may be executed by the processor 180 and/or the learning processor 130 of FIG. 1. Some components may be implemented as separate chips, ASICs, or FPGAs designed to operate only the corresponding component. Herein, the component may be considered as a hardware module. In addition, the at least one processor may include a general-purpose processor and a chip, an ASIC, or an FPGA designed to perform a specific function or configuration. The configuration shown in FIG. 4 is just only one embodiment. According to another embodiment, one component shown in FIG. 4 may be divided into several components, or several components are integrated into each other to form one component. In addition, according to another embodiment, some of the components shown in FIG. 4 may be deleted or components not shown in FIG. 4 may be added.

Referring to FIG. 4, the electronic device 100 may include a user interface unit 410, a capturing unit 420, a modeling unit 430, an object-of-interest inference unit 450, and a controller 460. An audio filter modeling unit 440 may be additionally included.

According to various embodiments of the present disclosure, the user interface unit 410 may receive a command from the user or control the output unit 150 to provide information to the user. According to the embodiment of the present disclosure, the user interface unit 410 may control the output unit 150 so that a video received from the capturing unit 420 is displayed on the screen of the display unit 151. In addition, the user interface unit 410 may obtain tag input information when a user performs a tag input operation. According to the embodiment, the user interface unit 410 may obtain coordinate information touched by the user or coordinate information clicked by a mouse on the touch screen.

FIGS. 5A to 5D are views showing a user interface which receives an input of a user for the purpose of selecting an object of interest and/or setting importance in accordance with various embodiments of the present disclosure. FIGS. 5A to 5D may be displayed on the screen of the display unit 151 under the control of the user interface unit 410.

Figure 5A:
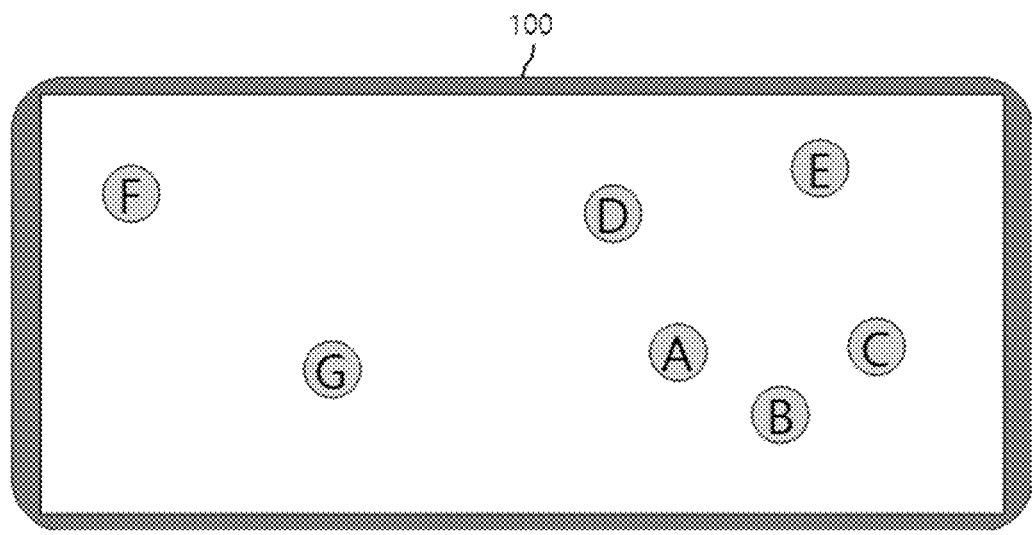
FIGS. 5A to 5D are views showing a user interface which receives an input of a user for the purpose of selecting an object of interest and/or setting importance in accordance with various embodiments of the present disclosure.

FIG. 5A shows an embodiment in which video captured by a camera is displayed on a screen of the display unit 151. Referring to FIG. 5A, according to the embodiment, the user interface unit 410 of the processor 180 may display a video including objects A through G captured by the camera 121 on the display unit 151. The user may select multiple objects which is to be subject to audio focusing from among the objects displayed on the display unit 151. Additionally, the user may also set the importance of each object when selecting multiple objects which is to be subject to audio focusing.

According to various embodiments, the user may perform a single touch input for object selection, a long touch input for object selection and importance selection of the object, and a double touch input for canceling the selected object. The long touch input may be performed by swiping after the touch or by maintaining the touch for a certain period of time after the touch. Here, the importance of the corresponding object may be determined in proportion to the length of the swiping or the length of time for which the touch is maintained after the touch. According to another embodiment, the user may perform an operation equivalent to the single touch input (e.g., single mouse click), the long touch input (e.g., swiping after a mouse click), and the double touch input (e.g., double mouse click), instead of the touch input using the touch screen, by using a mouse or other equivalent input tool for the electronic device 100 that is not equipped with the touch screen.

Figure 5B:
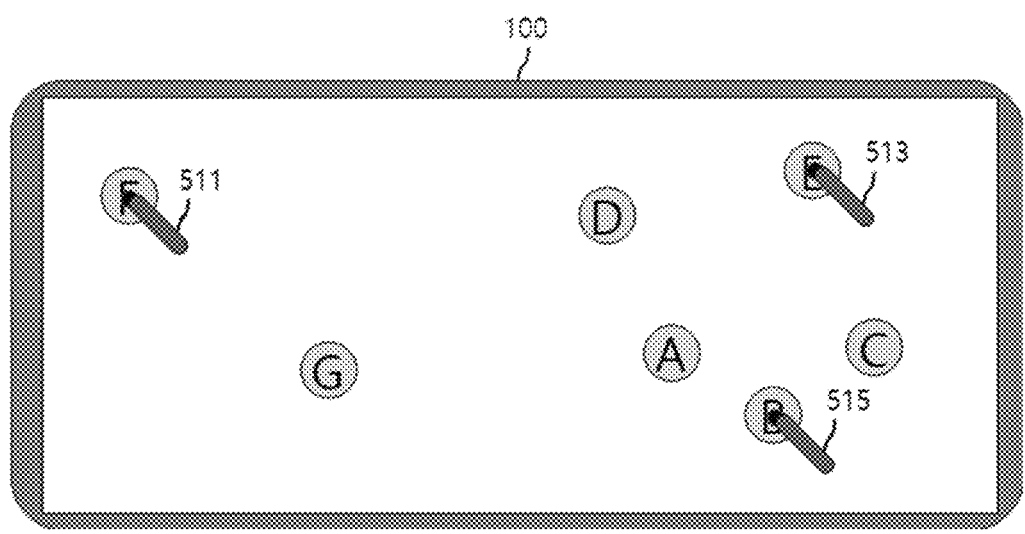

According to the embodiment of FIG. 5B, the user interface unit 410 may recognize that, based on the user input, a single touch input 511 to an object F, a single touch input 513 to an object E, and a single touch input 515 to an object B have occurred. The user interface unit 410 may transmit, to the capturing unit 420, tagging information indicating that a touch for user's selection of an object of interest has occurred on the object.

Figure 5C:
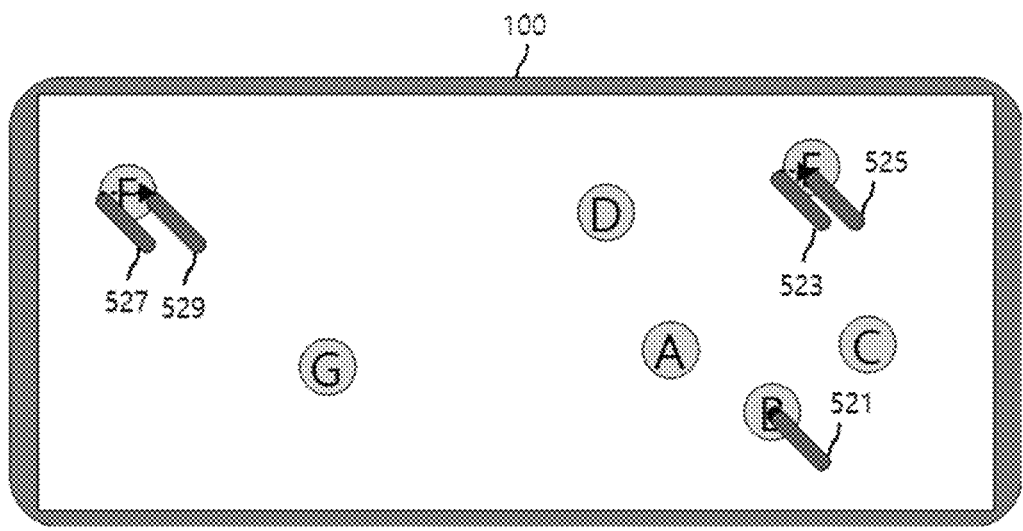

According to the embodiment shown in FIG. 5C, the user may select the object of interest for audio focusing and set the importance of the object of interest. The user interface unit 410 may recognize that swiping inputs 527 and 529 after the user's touch on the object F, swiping inputs 523 and 525 after the user's touch on the object E, and the user's single touch input 521 to the object B have occurred. In the swiping input after the touch, the length of the swiping may be information for setting the importance of the corresponding object. In the embodiment shown in FIG. 5C, based on the fact that the length of the swiping on the object F is greater than the length of the swiping on the object E, the object F may have a higher importance than that of the object E. The single touch input 521 to the object B may indicate the lowest importance. According to another embodiment, the user interface unit 410 may recognize an input which is maintained for a certain period of time after the touch instead of the swiping input after the touch, and the length of the period of time during which the input is maintained may indicate the importance of each of the objects of interest.

The user interface unit 410 may transmit, to the capturing unit 420, tagging information indicating that there has been a touch for user's selection of the object of interest. In this case, the tagging information may also include information on the setting of the importance of the object of interest according to the user input.

Figure 5D:
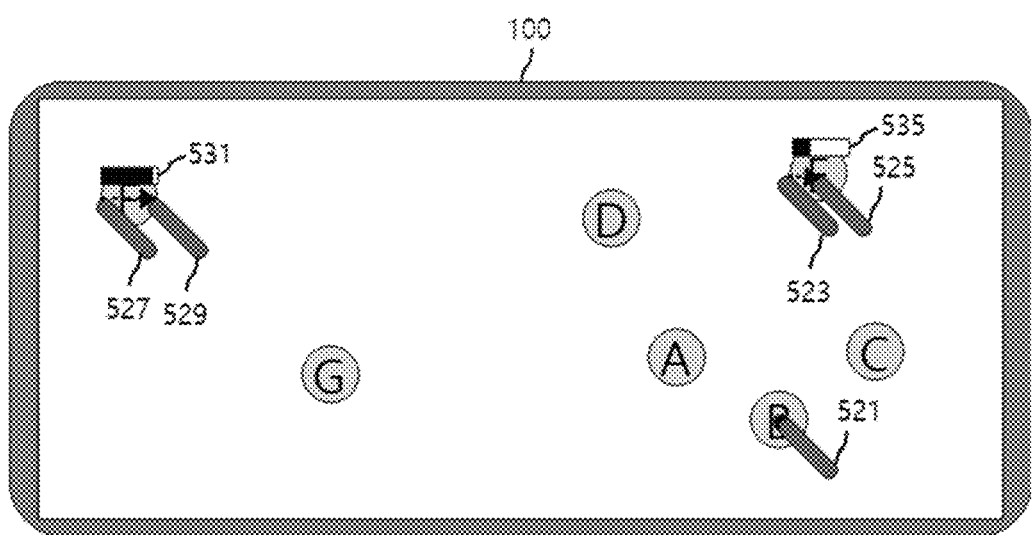

FIG. 5D is a view showing an example in which the user interface unit 410 of the processor 180 indicates the degree of importance set in the corresponding object at the time of swiping input after the user touch.

The user interface unit 410 may provide user interfaces 531 and 535 to the user by displaying the user interfaces 531 and 535 on the display unit 151 that display how much the importance is set in proportion to the length of the swiping or the period of time during which the touch is maintained. The user interface unit 410 may display the user interfaces 531 and 535 on or near the corresponding object of the display unit 151 at a point of time when the swiping starts after the touch. The user interface unit 410 may display the lowest level of importance at the first start and display that the object has a higher level of importance as the swiping gets longer. According to the embodiment, the user interface unit 410 may display a bar graph. For example, the user interface unit 410 displays a bar graph having all the white bars in order to indicate the lowest level of importance at the start of the swiping, and then displays a bar graph of which a black portion gradually increases as the length of the swiping increases. The user can recognize the importance set based on the degree of the black portion in the bar graph.

The object of interest and information on the importance of the corresponding object which are obtained based on the user input may be stored in the memory 170 by the user interface unit 410 or may be transferred to the capturing unit 420 by the user interface unit 410.

Referring back to FIG. 4, the capturing unit 420 may capture video. The captured video may include image data and audio data. The capturing unit 420 may scan the audio by using a directional microphone array composed of a plurality of microphones. Here, the scanning may mean obtaining audio data while sequentially changing the direction in which the microphone array is directed. The capturing unit 420 may store the captured video in the memory 170. Here, when the user performs a touch input, the capturing unit 420 may store the captured video together with the tagging information which is from the user interface unit 410 and indicates that a touch for user's selection of the object of interest has occurred. The tagging information may include the information on the importance of the corresponding object when the user performs an input.

According to various embodiments, the modeling unit 430 may select the object of interest.

According to the embodiment, the modeling unit 430 may select the object of interest on the basis of the user input. The video captured and stored in the photographing unit 420 may be stored together with the tagging information when the user performs the touch input. The modeling unit 430 may recognize the tagged object based on the related tagging information, and may select the tagged object as an object of interest.

According to another embodiment, the modeling unit 430 may select objects which can be an object of interest by extracting and classifying objects included in the video on the basis of the video captured by the capturing unit 420. The modeling unit 430 may extract an object by using an image processing algorithm and then may classify the objects included in the video through the machine learning based on the artificial neural network model (e.g., the artificial neural network of FIG. 2 and the convolutional neural network of FIG. 3). Alternatively, the modeling unit 430 may extract and classify an object included in the video through the machine learning based on the artificial neural network model (e.g., the artificial neural network of FIG. 2 and the convolutional neural network of FIG. 3). The modeling unit 430 may be provided with a separate artificial neural network model for object extraction and classification.

The modeling unit 430 may use the artificial neural network model which has been already learned for object extraction or classification. The artificial neural network model for object recognition and classification may have been already learned through unsupervised learning that uses various videos on the Internet as inputs in an external device. Thus, the learned artificial neural network model for recognizing and classifying objects may have been already made.

The modeling unit 430 may extract objects from all images and/or videos stored in the memory 170 using the learned artificial neural network model. The modeling unit 430 may perform preprocessing so that the size, the angle of view, and the brightness of the corresponding video become similar as possible for all the extracted objects, and perform classification based on the similarity using the learned artificial neural network model.

The modeling unit 430 may select objects which can be an object of interest after classification. The modeling unit 430 may select an object which has a high frequency at which the object appears in the image and/or video as the object of interest. For example, the modeling unit 430 may select a general object appearing in a video having a predetermined ratio (e.g., 0.7) or more of the entire video, as the object of interest. According to another embodiment, the modeling unit 430 may select both the object tagged by the user and the object of high frequency, as the object of interest.

According to various embodiments, the modeling unit 430 may determine the importance of the object selected as the object of interest and store the same at the time of registration. According to the embodiment, the modeling unit 430 may set the importance of the object of interest on the basis of the user input. The video stored by the capturing unit 420 may be stored together with the tagging information when the user performs a tagging input. The tagging information may include the information on the importance input by the user. The modeling unit 430 may determine the importance of the object of interest on the basis of the corresponding tagging information of the object of interest.

According to another embodiment, the modeling unit 430 may determine the importance of the object selected as the object of interest and store the same at the time of registration. According to the embodiment, the modeling unit 430 may set the importance on the basis of the number of times the object selected as the object of interest is tagged by the user. For example, the modeling unit 430 may set a high importance level for the object of interest with a large number of tagged times, and set a relatively low importance level for the object of interest with a small number of tagged times. According to another embodiment, the modeling unit 430 may determine the importance on the basis of the frequency at which each object of interest appears in the video stored in the memory 170. According to the embodiment of the present disclosure, the modeling unit 430 may set the importance to be high in the case of high frequency, and set the importance to be low in the case of relatively small frequency. The modeling unit 430 may store the set importance when registering the object of interest.

The modeling unit 430 may extract an image feature and an audio feature of the selected object. The modeling unit 430 may register the selected object as an object of interest while storing the image features and audio features of the object in the memory 170. The image feature and the audio feature of the registered object of interest may be used later to determine whether the object of interest is included in the video by the object-of-interest inference unit 450.

According to various embodiments, objects included in the video or in the image may be classified into a tagging object, a general object, or other objects. The tagging object may be an object of interest, and the general object may be an object which is capable of meaningful uttering such as a person or an animal or in which the user is interested. The other objects may be objects other than the tagging object and the general object.

The modeling unit 430 may generate a learning model (hereinafter referred to as an image learning model) associated with image features learned through machine learning based on an artificial neural network model (e.g., convolutional neural network of FIG. 3) and a learning model (hereinafter, referred to as an audio learning model) associated with the audio feature learned though machine learning based on an artificial neural network model (e.g., recurrent neural network, artificial neural network of FIG. 2, and convolutional neural network of FIG. 3). The modeling unit 430 may train the image learning model through supervised learning that uses image data including the selected object as learning data and provides a value representing the selected object with a label. In addition, the modeling unit 430 may train the audio learning model through supervised learning that uses audio data of a video including the selected object as learning data and provides a value representing the selected object with a label. The image learning model and the audio learning model may be used later to determine whether the object of interest is included in the video by the object-of-interest inference unit 450.

The modeling unit 430 may update the above-described image learning model and/or the audio learning model when a new video is stored in the memory 170 by the user or when there is a tag input by the user.

According to various embodiments of the present disclosure, the audio filter modeling unit 440 may model an audio feature on the basis of audio data of an object of interest (tagging object) and generate an audio filter capable of emphasizing the audio of each object of interest. The audio filter may be applied when it is determined that the audio of the object of interest is received and may be used to emphasize the audio of the object of interest.

In addition, the audio filter modeling unit 440 may generate an audio filter for general objects other than objects of interest. According to the embodiment, the audio filter modeling unit 440 extracts common or main audio data from a video including only general objects after classification in the modeling unit 430, and models an audio feature on the basis of the extracted audio data, and generates an audio filter capable of emphasizing the audio of the general object on the basis of this modeling. The audio filter for the general object may be used to emphasize the audio of the general object in a video in which tagging objects are not present and only general objects are present.

According to various embodiments of the present disclosure, the object-of-interest inference unit 540 may infer whether the object of interest is included in the video captured by the capturing unit 420.

The object-of-interest inference unit 450 may detect the candidate direction and the candidate object by determining whether the audio data obtained using the directional micro array is similar to the audio feature of the object of interest. The audio data may be obtained in different directions by performing scanning using the directional microphone array in the capturing unit 420. The object-of-interest inference unit 450 may determine similarity by inputting audio data into the audio learning model generated by the modeling unit 430. The object-of-interest inference unit 450 may detect the candidate direction by recognizing the scanning direction of the audio data determined to be similar. Also, the object-of-interest inference unit 450 may also detect a candidate object on the basis of the result of the similarity determination of the object of interest. The object-of-interest inference unit 450 may apply an audio filter generated by the audio filter modeling unit 440 to the detected candidate object in order to increase the accuracy of the candidate direction and the candidate object detection. The audio of the candidate object may be emphasized by applying the audio filter, whereby the audio features may be identified more clearly.

The object-of-interest inference unit 450 may extract objects from the image data obtained by the capturing unit 420 and input the extracted objects to the image learning model, thereby determining the similarity with the object of interest. According to the embodiment, the object-of-interest inference unit 450 may preferentially perform image matching on the object that is located in the candidate direction detected via the similarity comparison of the audio data, thereby shortening the time that it takes to recognize the object of interest. According to the embodiment, the object-of-interest inference unit 450 may detect candidate objects on the basis of the image learning model. According to another embodiment, the object-of-interest inference unit 450 may compare the first candidate object obtained based on the audio learning model or the audio feature with the second candidate object obtained based on the image learning model or the image feature, thereby inferring a final object of interest. According to various embodiments, the number of final objects of interest may be one or more.

The controller 460 may control the capturing unit 420 to obtain the position of the inferred final object of interest within a video which is being currently captured and to zoom in on the corresponding position. According to the embodiment, when multiple objects of interest are included in the video, the controller 460 may zoom in only enough to include all of the multiple objects of interest or may select one of the multiple objects of interest and zoom in the position of the selected object of interest.

The controller 460 may control the capturing unit 420 such that the directional microphone array is directed to the location of the inferred final object of interest. When multiple objects of interest are included in the video, the controller 460 may distribute the directivity of the directional microphone array to the multiple objects of interest through audio focusing distribution. According to the embodiment, the controller 460 may perform audio focusing distribution by adjusting the activity of a plurality of microphones included in the directional microphone array. For example, the controller 460 performs controls so that a high activity is given for a microphone directed to the object of interest having a high importance, and low activity is given for a microphone directed to the object of interest having a low importance, thereby performing the audio focusing distribution.

The controller 460 may apply an audio filter. The controller 460 may apply an audio filter corresponding to each inferred object of interest so that the audio of the object of interest is emphasized.

When objects of interest are not present and only general objects are present in the video captured by the capturing unit 420, the controller 460 controls the capturing unit 420 so that the directional microphone array is directed into the location of the inferred general object. When only multiple general objects are included in the video, the controller 460 may distribute the directivity of the directional microphone array to each of the multiple general objects through audio focusing distribution. In addition, the controller 460 may control the capturing unit 420 so that the audio of the general object is emphasized by applying an audio filter for the general object.

Figure 6A:
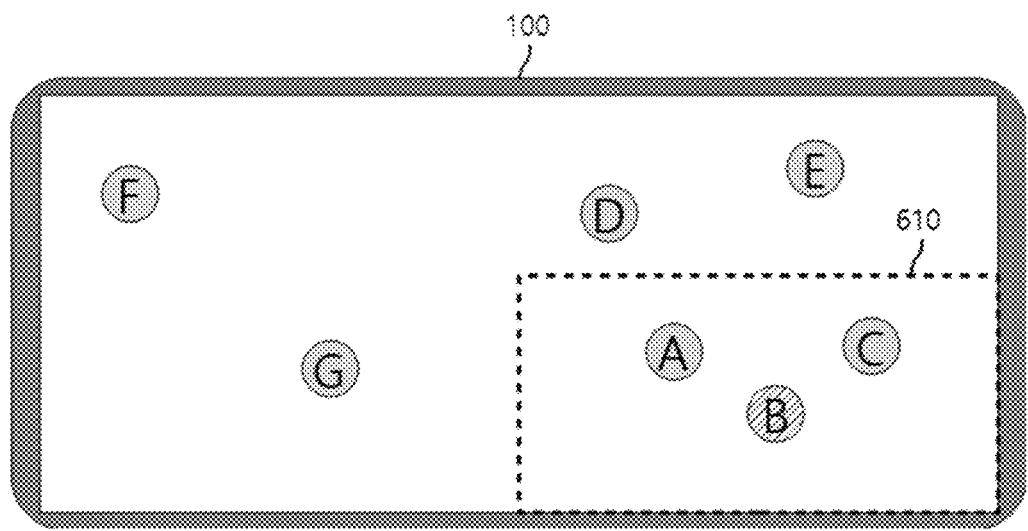
FIGS. 6A and 6B are views showing an example of a result of auto zoom in performed by the electronic device 100.
Figure 6B:
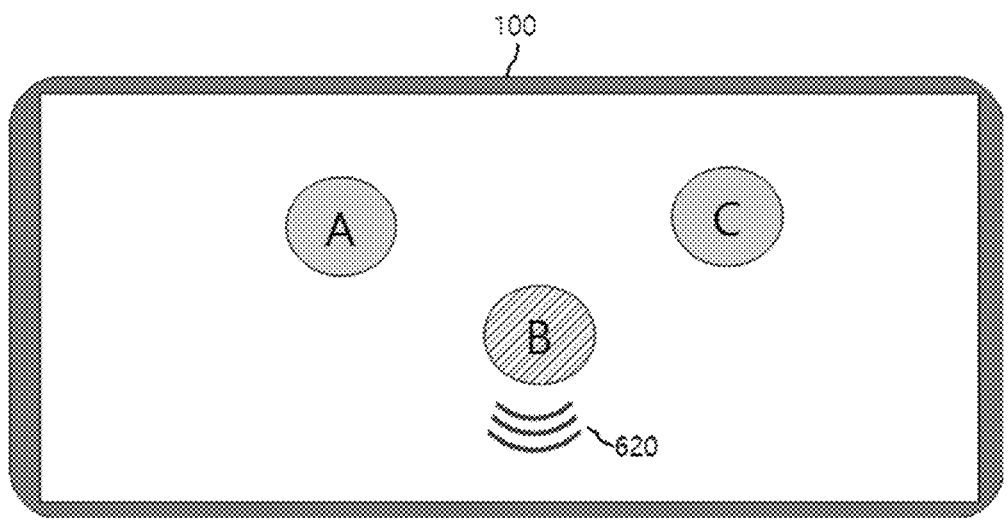

FIGS. 6A and 6B are views showing an example of a result of auto zoom in performed by the electronic device 100.

Referring to FIG. 6A, the electronic device 100 may infer that the object B is an object of interest by an operation to be described in detail and may automatically enlarge, as shown in FIG. 6B, an area 610 where the object B exists. Also, the electronic device 100 may direct the audio focusing to the object B by adjusting the directional microphone array. Also, the electronic device 100 applies an audio filter corresponding to the audio features of the object B, so that the audios of the objects A and C around the object B can be attenuated and the audio of the object B can be emphasized.

Figure 7:
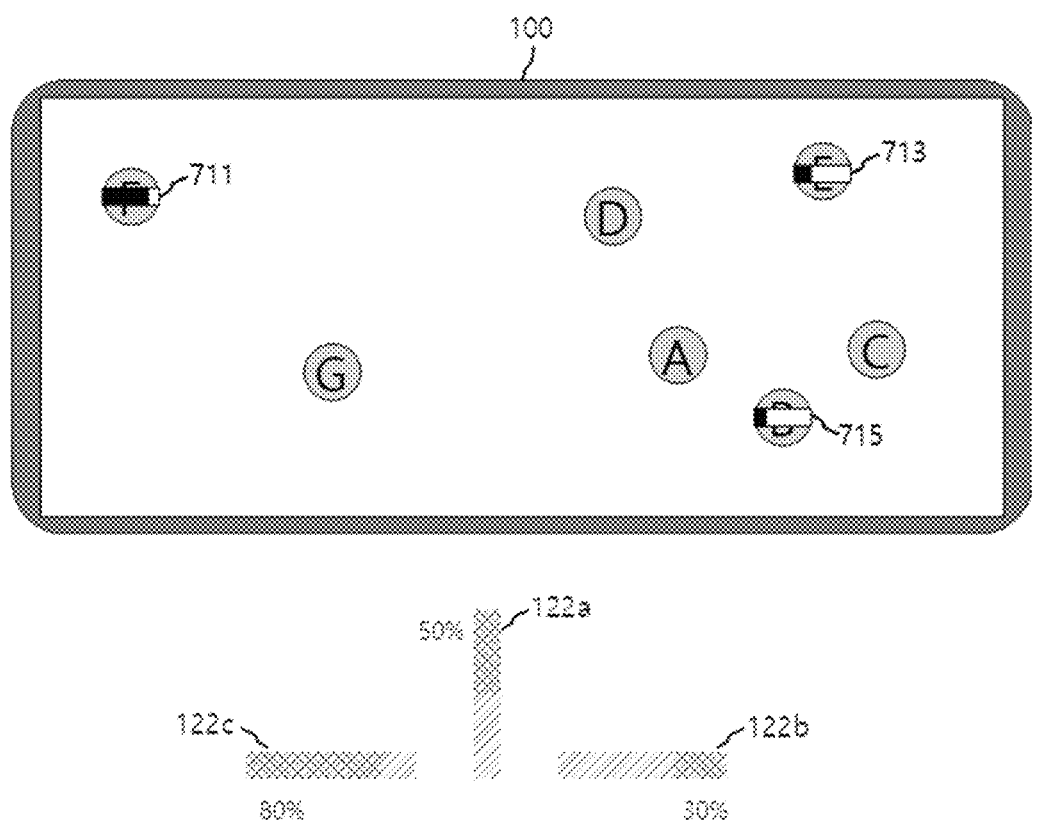
FIG. 7 is a view showing an audio focusing distribution result performed by the electronic device 100.

FIG. 7 is a view showing an audio focusing distribution result performed by the electronic device 100.

Referring to FIG. 7, the objects of interest inferred by the object-of-interest inference unit 450 may be objects B, E, and F. Each object may have importance levels 711, 713, and 715 set differently from each other. In the example of FIG. 7, the importance of each object of interest is shown over each object of interest, but may not be shown on the screen displayed actually to the user. In the example of FIG. 7, the longer the length of a black bar, the higher the importance.

In the example of FIG. 7, the objects of interest spread all over the screen, so that the controller 460 may not perform automatic enlargement.

Referring to FIG. 7, the controller 460 may determine that an object F at the top left has the highest importance 711, an object E at the top right has the next importance 713, and an object B at the bottom right has the lowest importance 715. The controller 460 may distribute audio focusing by adjusting the activity of each of the microphones 122a, 122b, and 122c on the basis of the position and the importance of the object of interest. According to the example of FIG. 7, the controller 460 performs control so that a high activity (e.g., 80%) is given for a microphone 122c directed toward the object F with the highest importance, and a low activity (e.g., 30%) is given for a microphone 122b directed toward the object E and object B with less importance than the object F. In addition, the microphone 122a directed toward the center may be adjusted to have a medium activity (e.g., 50%). As shown in FIG. 4, the controller 460 performs control so that a high activity is given for the microphone 122c directed toward the object of high importance, thereby distributing most audio focusing to the object of interest of high importance. In addition, the controller 460 may apply an audio filter for the objects of interest B, E, and F.

According to various embodiments, an electronic device (e.g., the electronic device 100 of FIG. 1) may comprise a capturing unit (e.g., the camera 121 of FIG. 1) configured to capture a video, a microphone array (e.g., the microphone 122 of FIG. 1 or microphones 122a, 122b, and 122c of FIG. 7) configured to have multiple microphones, a display unit configured to display the video (e.g., the display unit 151 of FIG. 1), and at least one processor (e.g., the processor 180 and the learning processor 130 of FIG. 1) configured to operatively connect to the capturing unit, the microphone array, and the output unit.

According to various embodiments, the at least one processor may register objects of interest, may display the video captured by the capturing unit on the display unit, may infer at least one object of interest included in the video among the objects of interest, may adjust a zoom of the video being captured by controlling the capturing unit on the basis of a position of the at least one object of interest, and may perform audio focusing by adjusting activity of each of the multiple microphones on the basis of a position of the at least one object of interest.

According to various embodiments, the at least one processor may identify an audio feature of each of the objects of interest, generate an audio filter capable of emphasizing the audio feature, and apply the audio filter capable of emphasizing the audio feature of the at least one object of interest to the video capturing to emphasize the audio of the at least one object of interest.

According to various embodiments, the electronic device may further comprise a memory. The at least one processor may extract an object from the video and/or the image stored in the memory and may select an object having tagging information indicating that the object has been selected as an object of interest by the user from among the extracted objects as the object of interest, and may register the object.

According to various embodiments, the electronic device may further comprise a memory. The at least one processor may extract an object from the video and/or the image stored in the memory and may select the object of interest on the basis of a frequency at which the same object appears in the video and/or the image, and may register the object.

According to various embodiments, the at least one processor may generate an artificial neural network model trained for object clustering; extract object images from the video and/or the image stored in the memory; preprocess the extracted object images; input the preprocessed object images to the artificial neural network model to cluster the preprocessed object images into images having similar features; and select the object of interest on the basis of the number of the object images included in the cluster.

According to various embodiments, the at least one processor may obtain audio data of the video while sequentially changing a direction in which the microphone array focuses; determine a similarity between an audio data feature of the video and an audio data feature of the registered object of interest to detect a candidate direction in which the object of interest is expected to be present; and extract an object that is in the candidate direction from the video and determine a similarity between an image feature of the extracted object and an image feature of the registered object of interest to infer the at least one object of interest.

According to various embodiments, the at least one processor may obtain audio data of the video while sequentially changing a direction in which the microphone array focuses; determine a similarity between an audio data feature of the video and an audio data feature of the registered object of interest to detect a first object that can be the object of interest and a candidate direction in which the first object is expected to be present; extract an object that is in the candidate direction from the video; determine a similarity between an image feature of the extracted object and an image feature of the registered object of interest to infer a second object; and infer an object included in both the first object and the second object as the at least one object of interest.

According to various embodiments, the at least one processor may generate an artificial neural network model; obtain audio data of the registered objects of interest from the video stored in a memory; obtain an audio learning model trained for classifying the objects in accordance with the audio data feature of the objects of interest by training the artificial neural model through use of the obtained audio data of the objects of interest; and input the obtained audio of the video to the audio learning model to determine the similarity of the audio data feature with the objects of interest.

According to various embodiments, the at least one processor may generate an artificial neural network model; obtain images of the registered objects of interest from the video stored in a memory; obtain an image learning model trained for classifying the objects in accordance with the image feature of the objects of interest by training the artificial neural model through use of the obtained images of the objects of interest; and input the obtained video to the image learning model to determine a similarity of the image feature with the objects of interest.

According to various embodiments, the at least one processor may adjust the zoom of the video being captured such that all of the at least one object of interest is included as large as possible in the video.

According to various embodiments, when there are multiple objects of interest, the at least one processor may distribute the audio focusing to the at least one object of interest by adjusting the activity of each of the multiple microphones.

Figure 8:
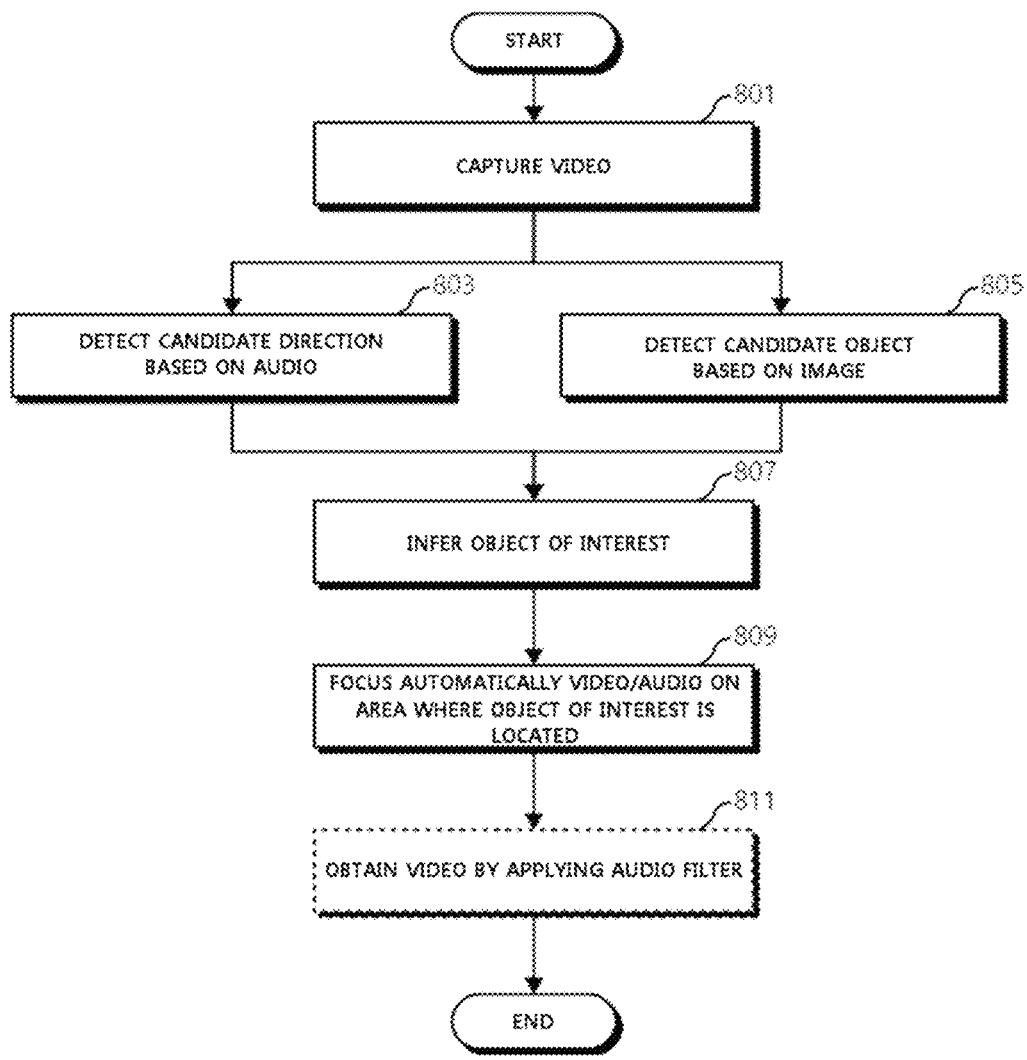
FIG. 8 is a flowchart showing an operation in which the electronic device 100 focuses video and audio on an area where the object of interest exists in accordance with various embodiments.

FIG. 8 is a flowchart showing an operation in which the electronic device 100 focuses video and audio on an area where the object of interest exists in accordance with various embodiments. Steps according to the flowchart shown in FIG. 8 may be implemented by an electronic device (e.g., the electronic device 100 of FIG. 1) or at least one processor (e.g., the processor 180 or the learning processor 130 of FIG. 1) of the electronic device.

Referring to FIG. 8, in step 801, the electronic device 100 may capture a video using the camera 121 and display the captured video on the screen of the display 151. According to the embodiment of the present disclosure, the electronic device 100 may sequentially obtain audio in different directions through directional microphone scanning during capturing the video.

According to various embodiments, in step 803, the electronic device 100 may detect a candidate direction in which it is determined that there is an object of interest by determining the audio feature similarity between the obtained audio and the registered object of interest. According to the embodiment of the present disclosure, the electronic device 100 may detect the candidate direction by determining the audio feature similarity between the object of interest and the audio in different directions, which is sequentially obtained through directional microphone scanning in step 801.

According to the embodiment, the electronic device 100 may determine the similarity using the audio learning model. The audio learning model may be trained through supervised learning that uses the audio of the registered object of interest stored in the electronic device 100 as training data. The electronic device 100 may input audio obtained in different directions into the audio learning model, and as a result, may obtain the object of interest information having high audio similarity. In addition, since the electronic device 100 identifies the direction of the audio in which the object of interest information with high audio similarity is obtained, the candidate direction in which it is expected that there is an object of interest may be detected. In addition, the electronic device 100 may additionally use an audio filter. The audio filter may be designed to emphasize audio corresponding to the audio feature of the object of interest. When the electronic device 100 obtains the object of interest object having high audio similarity, the electronic device 100 obtains the audio by applying the audio filter corresponding to the object of interest, and determines the similarity by inputting the obtained audio into the audio learning model, thereby improving the accuracy of the determination.

According to various embodiments, in step 805, the electronic device 100 may detect a candidate object having that similar to an image feature of the registered object of interest from the video being captured in step 801. According to the embodiment, the electronic device 100 may determine the similarity by using the image learning model. The image learning model may be trained through supervised learning using a video or an image of the object of interest registered in the electronic device 100 as training data. The electronic device 100 may extract the object from the obtained image data, perform preprocessing on the extracted object so that the size, angle of view, and brightness of the video for the extracted objects becomes as similar as possible to those of the image used when training the image learning model, and input the preprocessed object into the image training model, thereby obtaining the object of interest information having high image similarity. According to the embodiment, the electronic device 100 inputs only objects obtained in the candidate direction detected in step 803 into the image learning model and checks the result, whereby it is possible to detect the object of interest earlier compared to when inputting all extracted objects. According to another embodiment, the electronic device 100 may obtain information that there are no objects of interest and there are only general objects with high image similarity. In addition, the electronic device 100 may determine that there are no objects of interest and general objects, and there are only other objects.

According to various embodiments, in step 807, the electronic device 100 may infer that the object of interest in the video. According to the embodiment, the electronic device 100 may infer that all the objects of interest detected based on the image learning model in step 805 are included in the image. According to another embodiment, the electronic device 100 may infer a final object of interest by comparing the first candidate object detected based on the audio learning model in step 803 with the second candidate object detected based on the image learning model in step 805. For example, the electronic device 100 may infer an object included in both the first candidate object and the second candidate object as the object of interest included in the image. According to various embodiments of the present disclosure, the number of objects of interest that are inferred to be included in the image may be one or more. According to another embodiment, the electronic device 100 may infer that objects of interest are not present and only general objects are present in the image. According to another embodiment, the electronic device 100 may infer that both objects of interest and general objects are not present and only other objects are present in the image.

According to various embodiments, in step 809, the electronic device 100 may focus automatically the video and audio on the area where the object of interest is located.

According to the embodiment, when there is one object of interest included in the video or when multiple objects of interest are included in the video and are located in a limited area, the electronic device 100 may control the camera 121 to enlarge the area which includes the objects of interest. According to another embodiment, when multiple objects of interest are distributed in all areas of the video, the video may not be enlarged.

According to the embodiment, when only one object of interest is included in the video, the electronic device 100 may perform audio focusing on the corresponding object. For example, the electronic device 100 may control the microphone so that the direction in which the directional microphone array focuses becomes a direction in which the object of interest is located. According to another embodiment, when multiple objects of interest are included in the video, the electronic device 100 may distribute audio focusing to each of the multiple objects of interest. For example, the electronic device 100 may distribute audio focusing by adjusting activity for a plurality of microphones included in the directional microphone array. The electronic device 100 may distribute audio focusing on the basis of the importance of each of the multiple objects of interest included in the video. The electronic device 100 performs control to set a high activity for a microphone directed toward the object of interest with a high importance to have a high activity, and set a low activity for a microphone directed toward the object of interest having a low importance, thereby distributing the audio focusing.

According to another embodiment, when the object of interest is not included and only one general object is included in the image, the electronic device 100 may control the microphone so that the direction in which the directional microphone array focuses becomes the location of the general object. When only multiple general objects are included in the video, the electronic device 100 may distribute the audio focusing to each of the multiple general objects. Herein, the electronic device 100 may control the microphone under the assumption that all of the multiple general objects have the same importance.

According to various embodiments of the present disclosure, in step 811, the electronic device 100 may additionally obtain a video by applying an audio filter corresponding to each object of interest included in the video while emphasizing the audio of each object of interest. According to another embodiment, when objects of interest are present and only general objects are present in the video, the electronic device 100 may obtain the video while additionally applying the audio filter commonly created for the general object to emphasize the audio of the general object. When only other objects are present in the video, the electronic device 100 may not apply the audio filter.

By the above-described operation, the electronic device 100 performs automatically video focusing when capturing the video and performs the audio filtering to which the audio filter has been applied, thereby capturing a video in which the audio uttered by the object of interest is emphasized and the audio corresponding to the noise is reduced.

In the above-described flow chart, the object of interest has been already registered so that related information may be stored in the memory 170. The electronic device 100 recognizes that the user tags a specific object in the video being captured to select the object as the object of interest, or the electronic device 100 selects the frequency of the object on the basis of the frequency in which the object appears in the image or video stored in the memory 170. As an example, the electronic device 100 may select an object of interest by obtaining the frequency by extracting and clustering an object included in the video of the memory 170 on the basis of an artificial neural network model.

Figure 9:
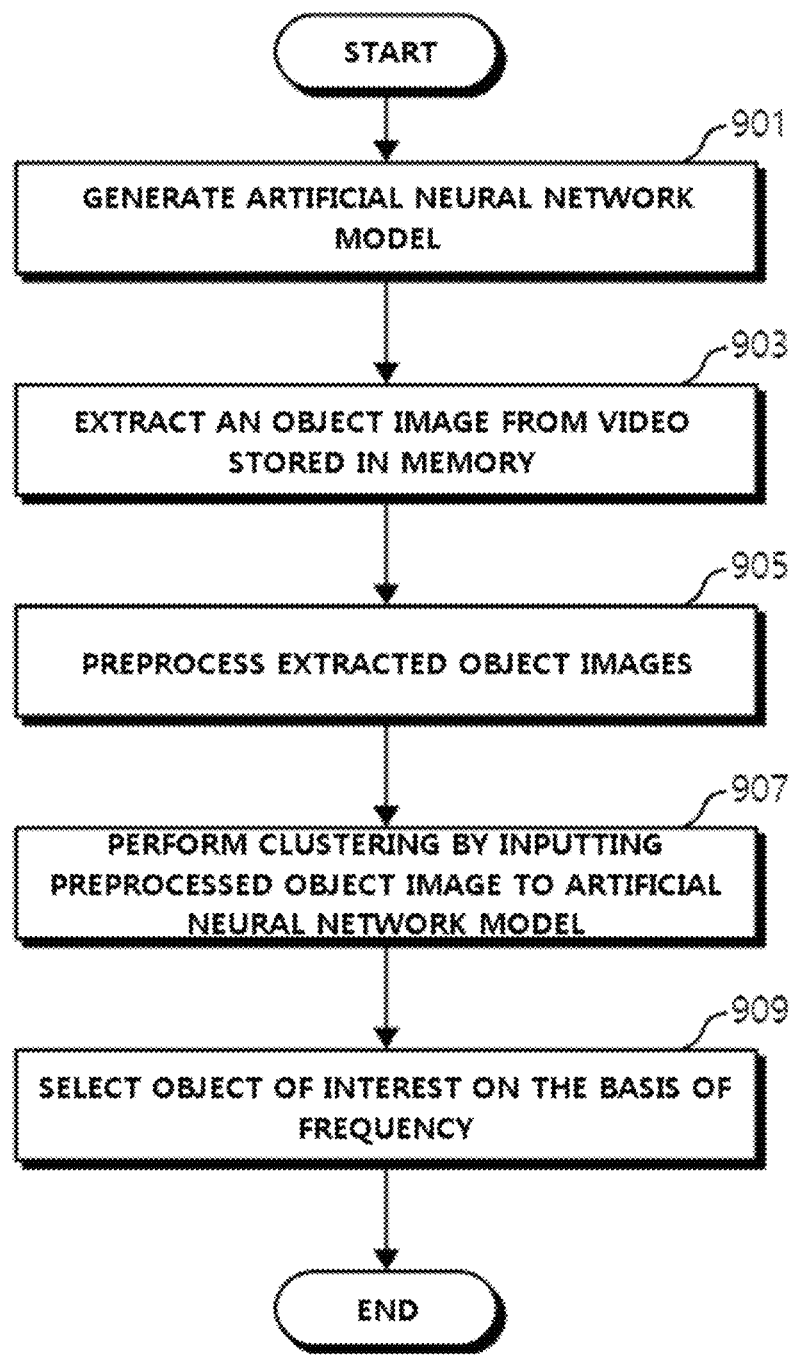
FIG. 9 is a flowchart showing an operation in which the electronic device 100 selects the object of interest on the basis of an artificial neural network model in accordance with various embodiments of the present disclosure.

FIG. 9 is a flowchart showing an operation in which the electronic device 100 selects the object of interest on the basis of an artificial neural network model in accordance with various embodiments of the present disclosure. The operations according to the flowchart shown in FIG. 9 may be implemented by an electronic device (e.g., electronic device 100 of FIG. 1) or at least one processor (e.g., processor 180 or learning processor 130 of FIG. 1) of the electronic device.

Referring to FIG. 9, in step 901, the electronic device 100 may generate an artificial neural network model for clustering. According to the embodiment, the artificial neural network model may be a convolutional neural network shown in FIG. 3. The electronic device 100 may generate an artificial neural network model that has already been learned. The electronic device 100 may generate an artificial neural network model that is trained so that images of the same object are included in a cluster by using various images existing on the Internet as inputs. Such artificial neural network model may be a commercial product. According to another embodiment, the electronic device 100 may store the learned parameters for the artificial neural network model for clustering in the memory 170, so that separate learning may be not required.

According to various embodiments of the present disclosure, in step 903, the electronic device 100 may extract an object image from an image and/or a video stored in the memory 170. When multiple objects are present in one image or one video, the object image may be extracted by separating each object. The electronic device 100 may perform the operation of extracting an object image from the image and/or the video by using an artificial neural network or by using a typical image processing and recognition program.

In step 905, the electronic device 100 may preprocess the obtained object images. According to the embodiment of the present disclosure, the electronic device 100 may perform preprocess so that the size, the angle of view, and the brightness of the corresponding image becomes similar as possible as for all the obtained objects.

In step 907, the electronic device 100 may input the preprocessed object image into the artificial neural network model generated in step 901 to perform clustering. The clustering may refer to a function of collecting object images having similar features. The artificial neural network model extracts features from an input object image and collects object images with similar features to each other for the clustering.

In step 909, the electronic device 100 may select and register an object of interest on the basis of the number of images included in each cluster. As an example, the electronic device 100 may select and register, as the object of interest, an object in which the number of images included in the cluster is more than the predetermined number. According to another embodiment, the electronic device 100 may sequentially arrange the objects from the largest number of images to the smallest number of images, and selects and registers, as the object of interest, the predetermined number of objects in front of the sequence.

Through the above-described operation flow, the electronic device 100 may register an object of interest.

The electronic device 100 may use an artificial neural network model to extract the audio feature and the image feature of the object of interest.

Figure 10:
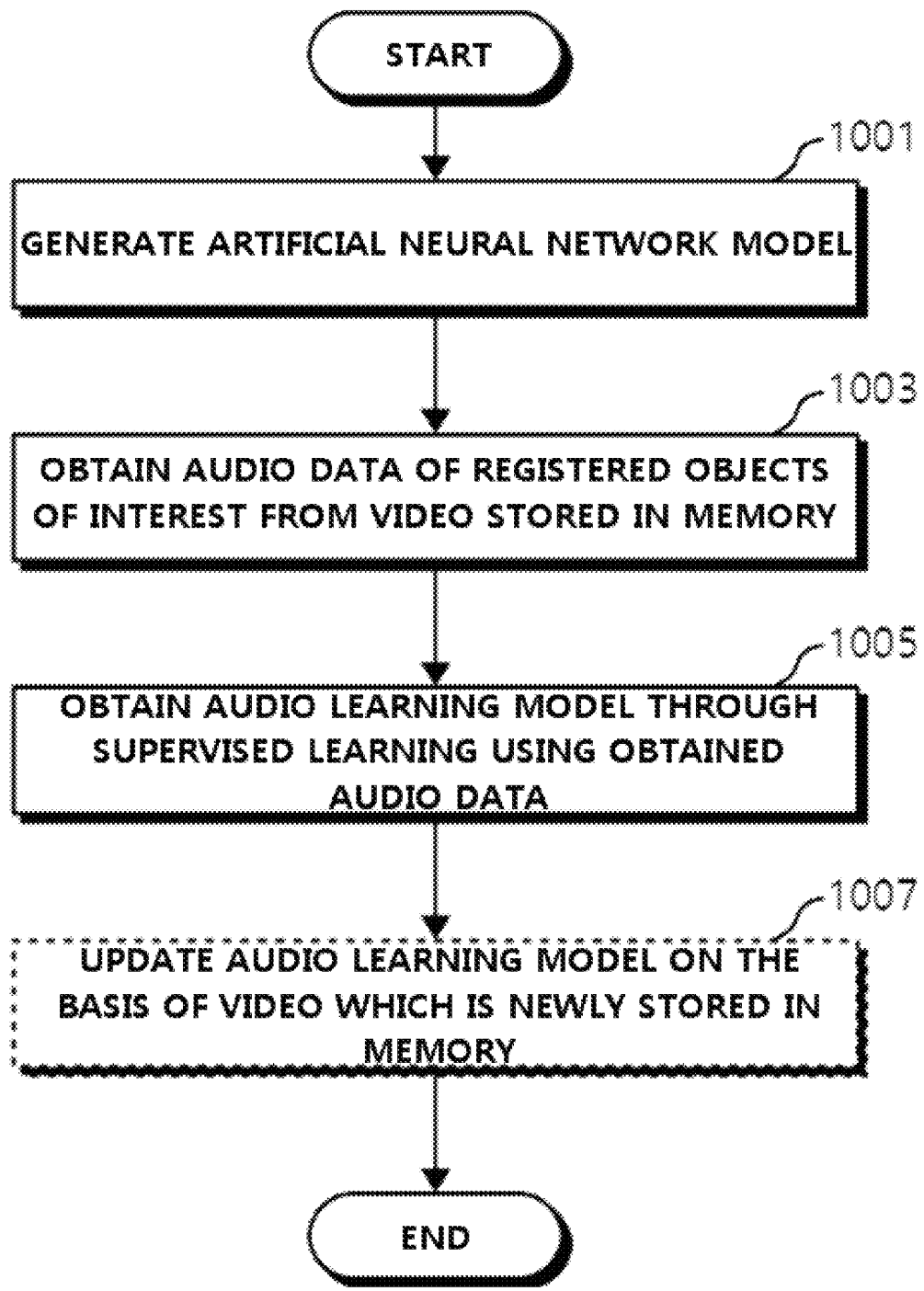
FIG. 10 is a flowchart showing an operation in which the electronic device 100 learns audio features of the object of interest on the basis of the artificial neural network model in accordance with various embodiments of the present disclosure.

FIG. 10 is a flowchart showing an operation in which the electronic device 100 learns audio features of the object of interest on the basis of the artificial neural network model in accordance with various embodiments of the present disclosure. The operations according to the flowchart shown in FIG. 10 may be implemented by an electronic device (e.g., electronic device 100 of FIG. 1) or at least one processor (e.g., processor 180 or learning processor 130 of FIG. 1) of the electronic device.

Referring to FIG. 10, in step 1001, the electronic device 100 may generate an artificial neural network model for storing audio features. In one embodiment, the artificial neural network model may be a cyclic artificial neural network suitable for processing sequential data or a LSTM or GRU obtained by modifying the same.

According to various embodiments of the present disclosure, in step 1003, the electronic device 100 may obtain audio data of registered objects of interest from the video stored in the memory 170.

In step 1005, the electronic device 100 trains the artificial neural network model generated in step 1001 to obtain an audio learning model through supervised learning that uses the obtained audio data and a label indicating the object of interest to which the audio data belong. The obtained audio learning model reflects the audio feature of the object of interest, and the electronic device 100 may identify the input audio data to be one of the objects of interest or may identify the input audio data not to be audio of the object of interest.

In step 1007, after the audio learning model is generated, when there is a video captured by the user and/or a video newly stored in the memory 170, the electronic device 100 may update the audio learning model on the basis of the same. According to the embodiment, the electronic device 100 may perform supervised learning by inputting the newly obtained audio data and the label into the audio learning model, thereby updating the audio learning model. According to another embodiment, the electronic device 100 may newly perform steps 1001 to 1005 to generate a completely new audio learning model.

According to the embodiment of the present disclosure, in step 1007, the audio learning model may be updated when there is a user request or when the electronic device 100 determines that the audio learning model is required to be updated (e.g., when a matching probability is lower than a predetermined value).

Figure 11:
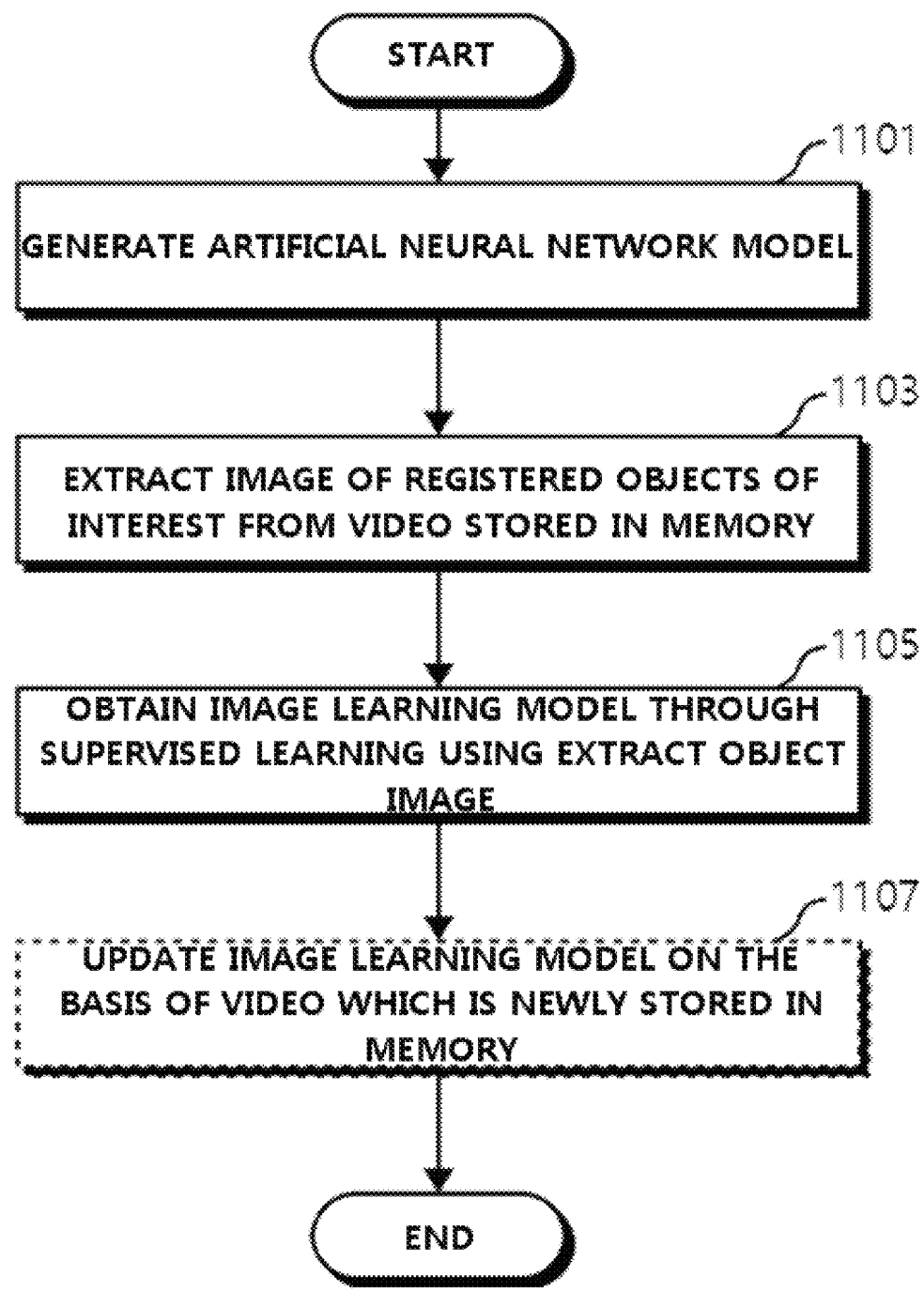
FIG. 11 is a flowchart showing an operation in which the electronic device 100 learns the image features of the object of interest on the basis of the artificial neural network model in accordance with various embodiments of the present disclosure.

FIG. 11 is a flowchart showing an operation in which the electronic device 100 learns the image features of the object of interest on the basis of the artificial neural network model in accordance with various embodiments of the present disclosure. The operations according to the flowchart shown in FIG. 11 may be implemented by an electronic device (e.g., electronic device 100 of FIG. 1) or at least one processor (e.g., processor 180 or learning processor 130 of FIG. 1) of the electronic device.

Referring to FIG. 11, in step 1101, the electronic device 100 may generate an artificial neural network model for storing image features. In one embodiment, the artificial neural network model may be a convolutional neural network having good performance in extracting features from two-dimensional images.

According to various embodiments of the present disclosure, in step 1103, the electronic device 100 may extract the image of registered objects of interest from a video stored in the memory 170. According to another embodiment, the image of the registered objects of interest may be selected from among the images extracted during the clustering of FIG. 9. Herein, it is possible to reduce waste of repeating the same operation.

In step 1105, the electronic device 100 may obtain the image learning model by training an artificial neural network model generated in step 1101 through supervised learning using the extracted object image as training data. The obtained image learning model reflects the image feature of the object of interest, and the electronic device 100 may be used to determine whether at least one of the objects of interest is included in the input video or image.

In step 1107, after the image learning model is generated, when there is a video captured by the user and/or a video newly stored in the memory 170, the electronic device 100 may update the image learning model on the basis of the same. According to the embodiment, the electronic device 100 may perform supervised learning by inputting the image and label of the newly obtained object of interest to the image learning model, thereby updating the image learning model. According to another embodiment, the electronic device 100 may newly perform steps 1101 to 1105 to generate a completely new image learning model.

According to the embodiment of the present disclosure, in step 1107, the image learning model may be updated when there is a user request or when the electronic device 100 determines that the image learning model is required to be updated (e.g., when a matching probability is lower than a predetermined value).

According to various embodiments, the electronic device 100 proposed in the present disclosure may automatically perform the video focusing or audio focusing on the basis of the captured video, while completely excluding user intervention. Accordingly, not only will the convenience for the user be improved, but the quality of the captured video will be improved.

According to various embodiments, an operation method of an electronic device (e.g., the electronic device 100 of FIG. 1) may comprise capturing video, displaying the video on a display unit, inferring at least one object of interest included in the video among the objects of interest, adjusting a zoom of the video being captured by controlling the capturing unit based on a position of the at least one object of interest and performing audio focusing by adjusting activity of each of the multiple microphones based on the position of the at least one object of interest.

According to various embodiments, the method may further comprise identifying an audio feature of each of the objects of interest, generating an audio filter capable of emphasizing the identified audio feature; and emphasizing an audio of the at least one object of interest by applying the audio filter capable of emphasizing the audio feature of the at least one object of interest to the video capturing.

According to various embodiments, the registering of the objects of interest may comprise extracting objects from a video and/or an image stored in a memory and selecting, as the object of interest, an object having tagging information indicating that the object has been selected as the object of interest by a user from among the extracted objects, and registering the object.

According to various embodiments, the registering of the objects of interest may comprise extracting object images from a video and/or an image stored in the memory and selecting the object of interest based on a frequency at which the same object appears in the video and/or the image and registering the object.

According to various embodiments, the registering of the objects of interest may comprise generating an artificial neural network model trained for object clustering; and preprocessing the extracted object images.

According to various embodiments, the selecting and registering of the object of interest based on a frequency at which the same object appears in the video and/or the image may comprise inputting the preprocessed object images to the artificial neural network model to cluster the preprocessed object images into images having similar features and selecting the object of interest based on the number of object images included in the cluster.

According to various embodiments, the inferring of at least one object of interest included in the video from the recognized at least one object may comprise obtaining audio data of the video while sequentially changing a direction in which the microphone array focuses, determining a similarity between an audio data feature of the video and an audio data feature of the registered object of interest to detect a candidate direction in which the object of interest is expected to be present, extracting an object that is in the candidate direction from the video, and determining a similarity between an image feature of the extracted object and an image feature of the registered object of interest to infer the at least one object of interest.

According to various embodiments, the inferring of at least one object of interest included in the video from the recognized at least one object may comprise obtaining audio data of the video while sequentially changing the direction in which the microphone array focuses, determining a similarity between an audio data feature of the video and an audio data feature of the registered object of interest to detect a first object capable of being the object of interest and a candidate direction in which the first object is expected to be present, extracting an object that is in the candidate direction from the video, determining a similarity between an image feature of the extracted object and an image feature of the registered object of interest to infer a second object and inferring an object included in both the first object and the second object as the at least one object of interest.

According to various embodiments, the determining the similarity between the audio data feature of the video and the registered audio data feature of the object of interest may comprise generating an artificial neural network model, obtaining audio data of the registered object of interest from the video stored in a memory, obtaining an audio learning model trained for classifying the objects in accordance with an audio data feature of the objects of interest by training the artificial neural model through use of the obtained audio data of the objects of interest and inputting the obtained audio of the video to the audio learning model to determine a similarity of the audio data feature with the objects of interest.

According to various embodiments, the determining the similarity between the audio data feature of the video and the registered audio data feature of the object of interest may comprise generating an artificial neural network model' obtaining images of the registered objects of interest from the video stored in a memory' obtaining an image learning model trained for classifying the objects in accordance with the image feature of the objects of interest by training the artificial neural model through use of the obtained images of the objects of interest and inputting the obtained video to the image learning model to determine a similarity of the image feature with the objects of interest.

According to various embodiments, the adjusting a zoom of the video being captured by controlling the capturing unit may comprise adjusting the zoom of the video being captured such that all of the at least one object of interest is included as large as possible in the video.

According to various embodiments, the performing the audio focusing may comprise distributing the audio focusing to the at least one object of interest by adjusting the activity of each of the multiple microphones, when there are multiple objects of interest.

As described above, the device and the method proposed in the present disclosure may automatically provide video focusing and audio focusing without user intervention, thereby enabling satisfactory captured video.

What is claimed is:

1. An electronic device comprising:
   a capturing unit configured to capture video;
   a microphone array comprising multiple microphones;
   a display unit configured to display the captured video; and
   at least one processor operatively coupled with the capturing unit, the microphone array, and the display unit, wherein the at least one processor is configured to:
   display, via the display unit, a video being captured;
   infer at least one object of interest included in the video being captured based on registered objects of interest;
   adjust a zoom of the video being captured by controlling the capturing unit based on a position of the inferred at least one object of interest; and
   perform audio focusing based on one or more of the multiple microphones based on the position of the inferred at least one object of interest.

2. The electronic device of claim 1, wherein the at least one processor is further configured to:
   identify an audio feature of each of the registered objects of interest;
   generate an audio filter configured to emphasize the audio feature; and emphasize audio of the inferred at least one object of interest by applying a corresponding audio filter to the video being captured.

3. The electronic device of claim 1, further comprising a memory, wherein the at least one processor is further configured to register objects of interest by:
   extracting objects from video or image data stored in the memory,
   selecting an object from the extracted objects based on tagging information indicating that the object has been selected as an object of interest by a user, and
   registering the object.

4. The electronic device of claim 1, further comprising a memory, wherein the at least one processor is further configured to register objects of interest by:
   extracting objects from video or image data stored in the memory,
   selecting an object from the extracted objects included in the video or image data based on a frequency at which the object appears in the video or image data; and
   registering the object.

5. The electronic device of claim 4, wherein the at least one processor is further configured to select the object from the extracted objects by:
   extracting object images from the video or image data stored in the memory;
   preprocessing the extracted object images;
   inputting the preprocessed object images to an artificial neural network model trained for object clustering to cluster the preprocessed object images into clusters of images having similar features, and
   selecting the object based on a number of the object images included in a corresponding cluster.

6. The electronic device of claim 1, wherein the at least one processor is further configured to infer the at least one object of interest by:
   obtaining audio data of the video being captured from different directions based on direction microphone scanning using the multiple microphones;
   determining a similarity between an audio data feature of the video being captured and audio data features of the registered objects of interest to detect a candidate direction in which a particular registered object of interest is expected to be present;
   extracting an object from the video being captured that is positioned in the candidate direction; and
   determining a similarity between an image feature of the extracted object and an image feature of the particular registered object of interest to infer the at least one object of interest.

7. The electronic device of claim 1, wherein the at least one processor is configured to:
   obtain audio data of the video being captured from different directions based on direction microphone scanning using the microphones;
   determine a similarity between an audio data feature of the video being captured and an audio data feature of the registered objects of interest to detect a first candidate object and a candidate direction in which the first candidate object is expected to be present;
   extract an object from the video being captured that is positioned in the candidate direction;
   determine a similarity between an image feature of the extracted object and an image feature of a particular registered object of interest to infer a second object, and
   infer the first object and the second object as the at least one object of interest.

8. The electronic device of claim 6, wherein the at least one processor is configured to:
   obtain audio data from video data stored in the memory of the registered objects of interest;
   train an audio learning model for classifying objects based on audio data features of the objects using the obtained audio data; and
   input the obtained audio data of the video being captured to the audio learning model to determine the similarity between the audio data feature of the video being captured and the audio data features of the registered objects of interest.

9. The electronic device of claim 6, wherein the at least one processor is configured to:
   obtain image data from video data stored in a memory of the registered objects of interest;
   train an image learning model for classifying objects based on image features of the objects using the obtained image data; and
   input image data from the video being captured to the image learning model to determine a similarity with the registered objects of interest.

10. The electronic device of claim 1, wherein the at least one processor is further configured to adjust the zoom of the video being captured such that all of the at least one object of interest is included as large as possible in the video being captured.

11. An operation method of an electronic device, the operation method comprising:
    capturing video;
    displaying the video on a display unit;
    inferring at least one object of interest included in the video being captured based on registered objects of interest;
    adjusting a zoom of the video being captured based on a position of the inferred at least one object of interest; and
    performing audio focusing based on one or more of a plurality of microphones included in a microphone array based on the position of the inferred at least one object of interest.

12. The operation method of claim 11, further comprising:
    identifying an audio feature of each of the registered objects of interest;
    generating an audio filter configured to emphasize the audio feature; and
    emphasizing audio of the inferred at least one object of interest by applying a corresponding audio filter to the video being captured.

13. The operation method of claim 11, wherein registering objects of interest comprises:
    extracting objects from video or image data stored in a memory;
    selecting an object from the extracted objects included in the video or image data based on tagging information indicating that the object has been selected as an object of interest by a user; and
    registering the object.

14. The operation method of claim 11, wherein registering objects of interest comprises:
    extracting objects from video or image data stored in a memory; and
    selecting an object from the extracted objects included in the video or image data based on a frequency at which the object appears in the video or image data; and
    registering the object.

15. The operation method of claim 14, wherein selecting the object from the extracted objects comprises:
- extracting object images from the video or image data stored in the memory;
- preprocessing the extracted object images;
- inputting the preprocessed object images to an artificial neural network model trained for object clustering to cluster the preprocessed object images into clusters of images having similar features; and
- selecting the object based on a number of the object images included a corresponding cluster.

16. The operation method of claim 11, wherein inferring the at least one object of interest comprises:
- obtaining audio data of the video being captured from different directions based on direction microphone scanning using the plurality of microphones;
- determining a similarity between an audio data feature of the video being captured and audio data features of the registered objects of interest to detect a candidate direction in which a particular registered object of interest is expected to be present;
- extracting an object from the video being captured that is positioned in the candidate direction; and
- determining a similarity between an image feature of the extracted object and an image feature of the particular registered object of interest to infer the at least one object of interest.

17. The operation method of claim 11, wherein inferring the at least one object of interest comprises:
- obtaining audio data of the video being captured from different directions based on direction microphone scanning using the plurality of microphones;
- determining a similarity between an audio data feature of the video being captured and an audio data feature of the registered objects of interest to detect a first candidate object and a candidate direction in which the first candidate object is expected to be present;
- extracting an object from the video being captured that is positioned in the candidate direction;
- determining a similarity between an image feature of the extracted object and an image feature of a particular registered object of interest to infer a second object; and
- inferring the first object and the second object as the at least one object of interest.

18. The operation method of claim 16, further comprising:
- obtaining audio data from video data stored in the memory of the registered objects of interest;
- training an audio learning model for classifying objects based on audio data features of the objects using the obtained audio data; and
  - inputting the obtained audio data of the video being captured to the audio learning model to determine the similarity between the audio data feature of the video being captured and the audio data features of the registered objects of interest.

19. The operation method of claim 16, further comprising:
- obtaining image data from video data stored in a memory of the registered objects of interest;
- training an image learning model for classifying objects based on image features of the objects using the obtained image data; and
- inputting image data from the video being captured to the image learning model to determine a similarity with the registered objects of interest.

20. The operation method of claim 11, wherein the zoom of the video being captured is adjusted such that all of the at least one object of interest is included as large as possible in the video being captured.

* * * * *